United States Patent
Clark et al.

(10) Patent No.: US 8,682,580 B2
(45) Date of Patent: Mar. 25, 2014

(54) DATA DRIVEN ROUTE STRIP

(75) Inventors: Jason W. Clark, Evergreen, CO (US);
Cindy Dorfmann, Darmstadt (DE);
Milan Guenther, Berlin (DE)

(73) Assignee: The Boeing Company, Chicago, IL (US)

( * ) Notice: Subject to any disclaimer, the term of this patent is extended or adjusted under 35 U.S.C. 154(b) by 526 days.

(21) Appl. No.: 12/850,855

(22) Filed: Aug. 5, 2010

(65) Prior Publication Data

US 2012/0035849 A1 Feb. 9, 2012

(51) Int. Cl.
- *G06F 7/70* (2006.01)
- *G06F 19/00* (2011.01)
- *G06G 7/00* (2006.01)
- *B64F 1/20* (2006.01)
- *G08G 5/00* (2006.01)
- *G08G 1/123* (2006.01)

(52) U.S. Cl.
USPC ........ 701/467; 701/14; 340/951; 340/995.24; 340/995.27

(58) Field of Classification Search
USPC ......... 701/467, 3, 14–17, 117, 400, 408, 416, 701/428–429, 431–432, 437, 439, 440, 701/458–460, 528; 340/947–948, 951, 340/995.1
See application file for complete search history.

(56) References Cited

U.S. PATENT DOCUMENTS

| | | | |
|---|---|---|---|
| 3,056,111 A | 9/1962 | Finkler et al. | |
| 5,797,106 A | 8/1998 | Murray et al. | |
| 6,542,796 B1 | 4/2003 | Gibbs et al. | |
| 6,946,976 B1 | 9/2005 | Langner et al. | |
| 7,342,514 B1 * | 3/2008 | Bailey et al. | 340/961 |
| 2006/0066638 A1 * | 3/2006 | Gyde et al. | 345/635 |
| 2010/0090869 A1 * | 4/2010 | Wipplinger et al. | 340/977 |
| 2010/0228418 A1 * | 9/2010 | Whitlow et al. | 701/25 |

* cited by examiner

*Primary Examiner* — Khoi Tran
*Assistant Examiner* — Abby Lin
(74) *Attorney, Agent, or Firm* — Yee & Associates, P.C.

(57) ABSTRACT

A method, computer system, and computer program product for displaying flight information. A number of elements for a number of phases of flight for a route of an aircraft are identified. The number of elements in association with the number of phases of flight is displayed on a strip on a display. The number of elements is displayed on the strip in a sequence in which the number of elements is encountered by the aircraft on the route during the number of phases of flight.

19 Claims, 19 Drawing Sheets

DATA DRIVEN ROUTE STRIP

BACKGROUND INFORMATION

1. Field

The present disclosure relates generally to aircraft and, in particular, to aeronautical information display systems in aircraft. Still more particularly, the present disclosure relates to a method and apparatus for presenting aeronautical information on a computer display system in an aircraft.

2. Background

In flying from one location to another location, aircrafts commonly follow a pre-planned route. The information for the route is referred to as a flight plan. A flight plan includes basic information, such as departure and arrival points, estimated time en route, alternate airports, and other suitable types of information.

Additionally, this information, as well as other information, is used by the pilot of an aircraft during the flight. Other information includes, for example, information, such as taxi routes, a take-off runway, terminal procedures, and/or other suitable aircrafts.

Information used to operate an aircraft may be displayed in the form of a chart. When the aircraft is in the air, a chart of the terrain is displayed. A location of the aircraft relative to the terrain is displayed on the chart. This location also may include a direction in which the aircraft is facing. In addition to the terrain, information, such as waypoints, very high frequency (VHF) omni-directional radio range frequencies, a route of the aircraft, airports, cities, and/or other suitable information are displayed.

While an aircraft is on the ground, a chart of the airport is often displayed with a location of the aircraft on the chart. The chart of the airport includes objects, such as runways, taxiways, terminals, buildings, communication frequencies, operation hours for the airport, and other suitable information.

The information used by the pilot to operate the aircraft is often displayed on a single display on the flight deck of the aircraft. Menus and other user controls may be present to allow a pilot to select more details about a desired piece of information.

The large amount of information that is displayed requires the pilot and other flight crew members to increase their concentration to identify the information needed to operate the aircraft. Depending upon the amount of information and the number of user inputs needed to obtain the information desired, the amount of time and effort needed to identify information for a flight may increase. As a result, more than one flight crew member may be needed to perform different operations during the flight.

Therefore, it would be advantageous to have a method and apparatus that takes into account one or more of the issues discussed above, as well as possibly other issues.

SUMMARY

In one advantageous embodiment, a method is provided for displaying flight information. A number of elements for a number of phases of flight for a route of an aircraft are identified. The number of elements in association with the number of phases of flight is displayed on a strip on a display system. The number of elements is displayed on the strip in a sequence in which the number of elements is encountered by the aircraft on the route during the number of phases of flight.

In another advantageous embodiment, a computer system for displaying flight information for an aircraft comprises a display system, a storage device containing program code, and a processor unit configured to execute the program code. The processor unit executes the program code to identify a number of elements for a number of phases of flight for a route of the aircraft. The processor unit executes the program code to display the number of elements in association with the number of phases of flight on a strip on the display system. The number of elements is displayed on the strip in a sequence in which the number of elements is encountered by the aircraft on the route during the number of phases of flight.

In yet another advantageous embodiment, a computer program product for displaying flight information comprises a computer recordable storage medium and program code, stored on the computer recordable storage medium. Program code is present for identifying a number of elements for a number of phases of flight for a route of an aircraft. Program code is present for displaying the number of elements in association with the number of phases of flight on a strip on a display. The number of elements is displayed on the strip in a sequence in which the number of elements is encountered by the aircraft on the route during the number of phases of flight.

In still yet another advantageous embodiment, an aircraft information display system comprises a number of display devices and a processor unit connected to the number of display devices. The processor unit is configured to identify a number of elements for a number of phases of flight for a route of an aircraft during operation of the aircraft. The number of elements represents a first portion of a plurality of waypoints. The first portion of the plurality of waypoints has a lower priority than a second portion of the plurality of waypoints. The processor unit is configured to display the number of elements on a strip on the number of display devices. The number of elements is displayed on the strip in a sequence. The first portion of the plurality of waypoints represented by the number of elements is encountered by the aircraft during the number of phases of flight. The processor unit is configured to display a number of graphical indicators for the second portion of the plurality of waypoints on the strip in locations relative to the number of elements displayed on the strips based on locations of the second portion of the plurality of waypoints relative to locations of the first portion of the plurality of waypoints. The number of graphical indicators provides less information about the second portion of the plurality of waypoints as compared to the number of elements displayed on the strip for the first portion of the plurality of waypoints.

In another advantageous embodiment, a method of displaying flight information on a display system in an aircraft is provided. A computer system in the aircraft displays an elongate strip in a graphical user interface on the display system for the aircraft. The elongate strip is divided into sections corresponding to at least a portion of phases of flight for the aircraft. The sections are in an order of when each phase of flight occurs relative to another phase of flight in the phases of flight represented by the sections. The computer system displays elements on the sections based on at least a portion of the phases of flight represented by the sections. The elements are displayed in a sequence in which the elements are encountered by the aircraft during the phases of flight. In response to a current phase of flight for the aircraft changing, the computer system updates the sections and the elements displayed on the sections to include the sections and the elements for a number of phases of flight including the current phase of flight for the aircraft.

In yet another advantageous embodiment, a method is provided for operating an aircraft on-board flight information system having a graphical user interface. A plurality of sequential phases of flight is defined. A plurality of information elements is received. Each information element in the plurality of information elements relates to a particular period of flight. An elongate strip is displayed in the graphical user interface in a direction representing a time axis of the flight. The elongate strip is graphically sectioned into one or more sections distributed along the time axis and corresponds to a subset of adjacent ones of the sequential phases of flight. One or more graphical elements are overlaid on the sections within the elongate strip. Each graphical element represents one or more of the plurality of information elements and is positioned on the time axis according to the particular period of flight to which the information element represented relates. A current or anticipated phase of flight is established. The elongate strip displayed in the graphical user interface and the graphical elements representing the plurality of information elements relating to a time period represented by the sections displayed are automatically updated.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
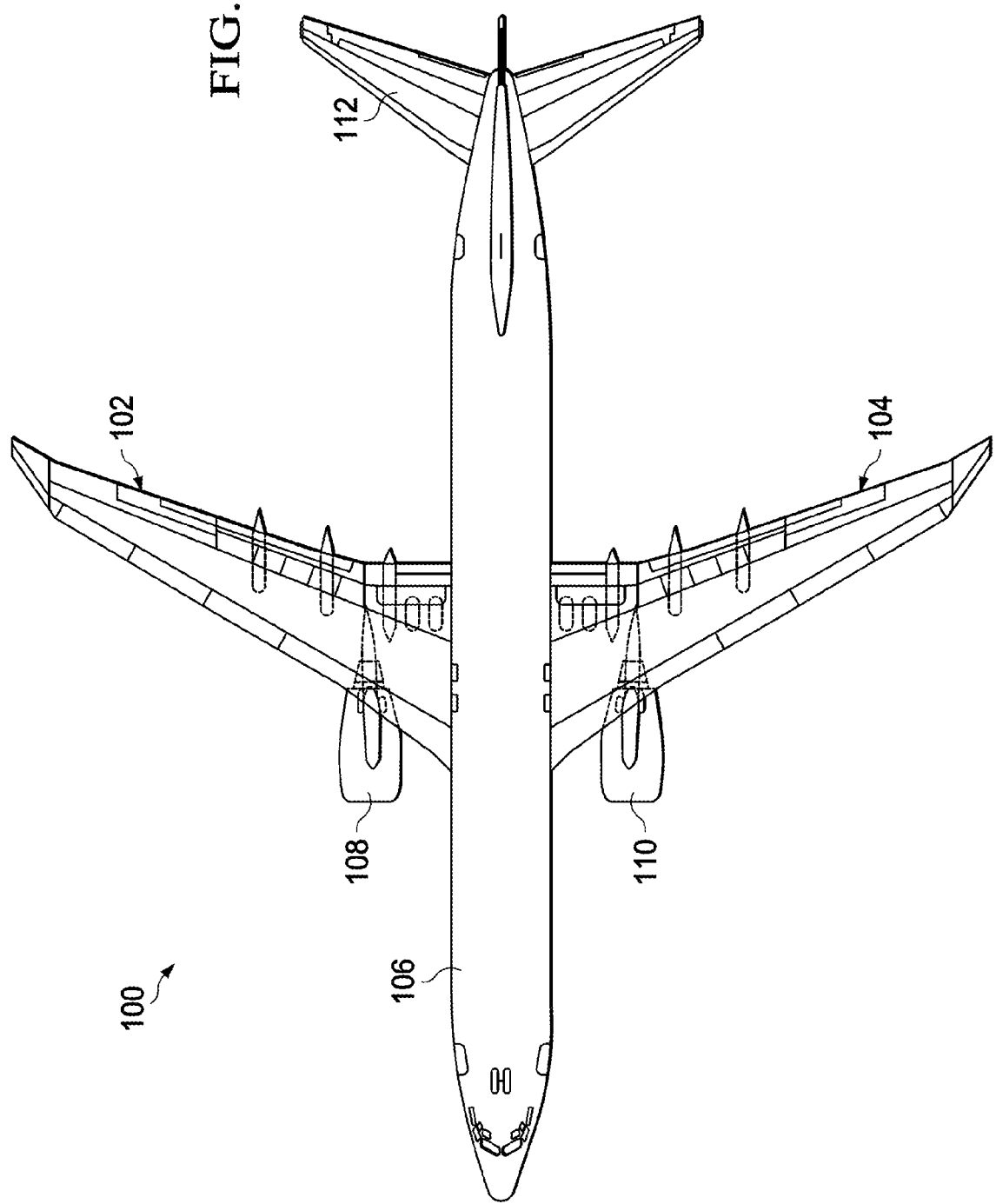
FIG. 1 is an illustration of an aircraft in which an advantageous embodiment may be implemented.

With reference now to the figures and, in particular, with reference to FIG. 1, an illustration of an aircraft is depicted in which an advantageous embodiment may be implemented. Aircraft 100 is an example of an aircraft in which information used to operate an aircraft may be implemented. In these illustrative examples, the information may be presented in a graphical user interface with a strip displaying information about a route in accordance with an advantageous embodiment. In this illustrative example, aircraft 100 has wings 102 and 104 attached to body 106. Aircraft 100 includes wing-mounted engine 108, wing-mounted engine 110, and tail 112.

Figure 2:
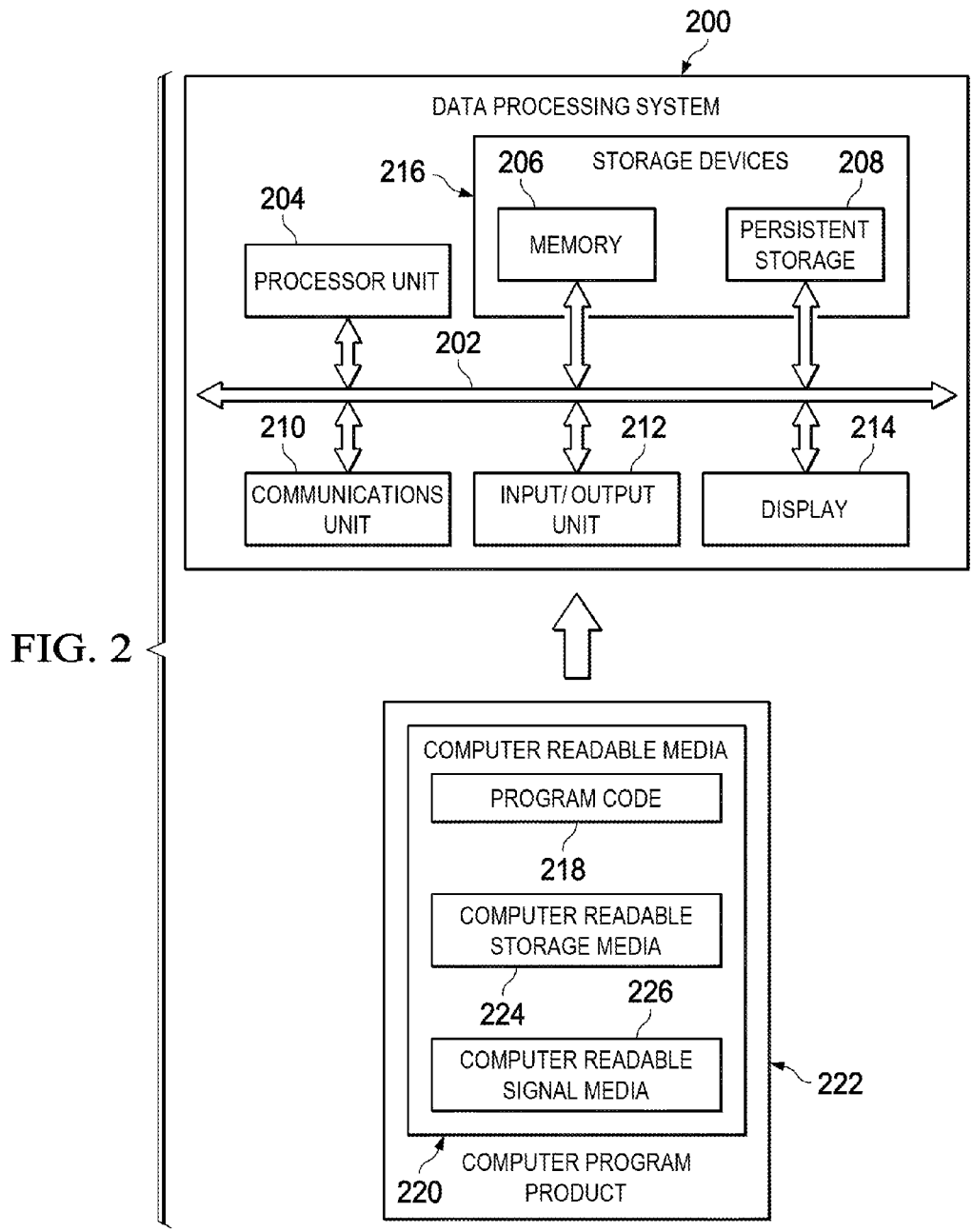
FIG. 2 is an illustration of a data processing system in accordance with an advantageous embodiment.

Turning now to FIG. 2, an illustration of a data processing system is depicted in accordance with an advantageous embodiment. Data processing system 200 is an example of a data processing system that may be used in aircraft 100 in FIG. 1 to implement one or more advantageous embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device.

Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communication links, such as wireless communication links, an optical fiber cable, a coaxial cable, a wire, and/or any other suitable type of communication link. In other words, the communication link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

The different advantageous embodiments recognize and take into account a number of different considerations. For example, the different advantageous embodiments recognize and take into account that currently available computer systems provide a large amount of information to the flight crew. The different advantageous embodiments recognize and take into account that changes and improvements can be made to the currently available display systems to increase the ability of a pilot or other operator of an aircraft to obtain information to operate the aircraft.

For example, existing computer systems include applications that show representations of charts. These charts include information, such as, for example, without limitation, waypoints, communication frequencies, geographical markers, radio navigation aids, very high frequency (VHF) omni-directional-range-radio (VOR) stations, airports, and/or other suitable information. The presentation of this information includes information of interest, as well as other information that may be needed at a particular point in time. This additional information may form clutter for an operator looking for the information of interest for use in operating the aircraft.

The different advantageous embodiments recognize and take into account that these charts may have different filters applied to a chart. The different advantageous embodiments recognize and take into account that the filters require user input to obtain the information of interest. This user input may require the attention of the operator and may add to the time and effort needed to obtain the information. Also, by diverting the attention of the operator to select filters for the information of interest, the situation awareness of the operator may be reduced.

Additionally, the different advantageous embodiments recognize that the route information displayed on these charts is currently displayed only during the flight of the aircraft. The different advantageous embodiments recognize and take into account that it would be desirable to provide other information, such as departure and/or arrival information, about other phases of operating the aircraft.

The different advantageous embodiments also recognize and take into account that another manner in which aeronautical information is currently displayed is through text. This text includes information about the route.

The different advantageous embodiments also recognize and take into account that currently used computers, such as electronic flight bags (EFBs), simulate paper charts and information in an electronic form. The different advantageous embodiments recognize and take into account that even with electronic flight bags and other navigation devices, a pilot still needs to identify the phase of flight for the aircraft to use the electronic flight bags and the other navigation devices. The pilot identifies the chart or other information needed based on knowing the phase of flight.

The different advantageous embodiments recognize and take into account that it is desirable to have a method and apparatus that presents information for a route of a flight based on a process identifying the location of the aircraft and/or the phase of flight. The process then presents information needed to perform operations for the particular phase of flight. In the different advantageous embodiments, the process is driven by the information needed for a phase of flight rather than by an operator selecting a chart.

In this manner, the attention of the operator may be focused on other duties or tasks. Therefore, the time and effort needed perform tasks in operating an aircraft may be reduced. Further, without the need for the user input to look for the information of interest, the situational awareness of the operator may be increased.

Thus, the advantageous embodiments provide a method and apparatus for displaying flight information. A number of elements for a number of phases of flight for a route of an aircraft is identified. The number of elements is displayed in association with the number of phases of flight on a strip on a display. The number of elements is displayed on the strip in a sequence in which the number of elements is encountered by the aircraft on the route during the number of phases of flight.

In the illustrative examples, the information represented by the number of elements is selected based on the current phase of flight for an aircraft. Other phases of flight, in addition the current phase of flight, also may be used to identify the elements. As the flight progresses, the number of elements selected for display on the strip changes to provide information relevant for a current phase of flight.

Figure 3:
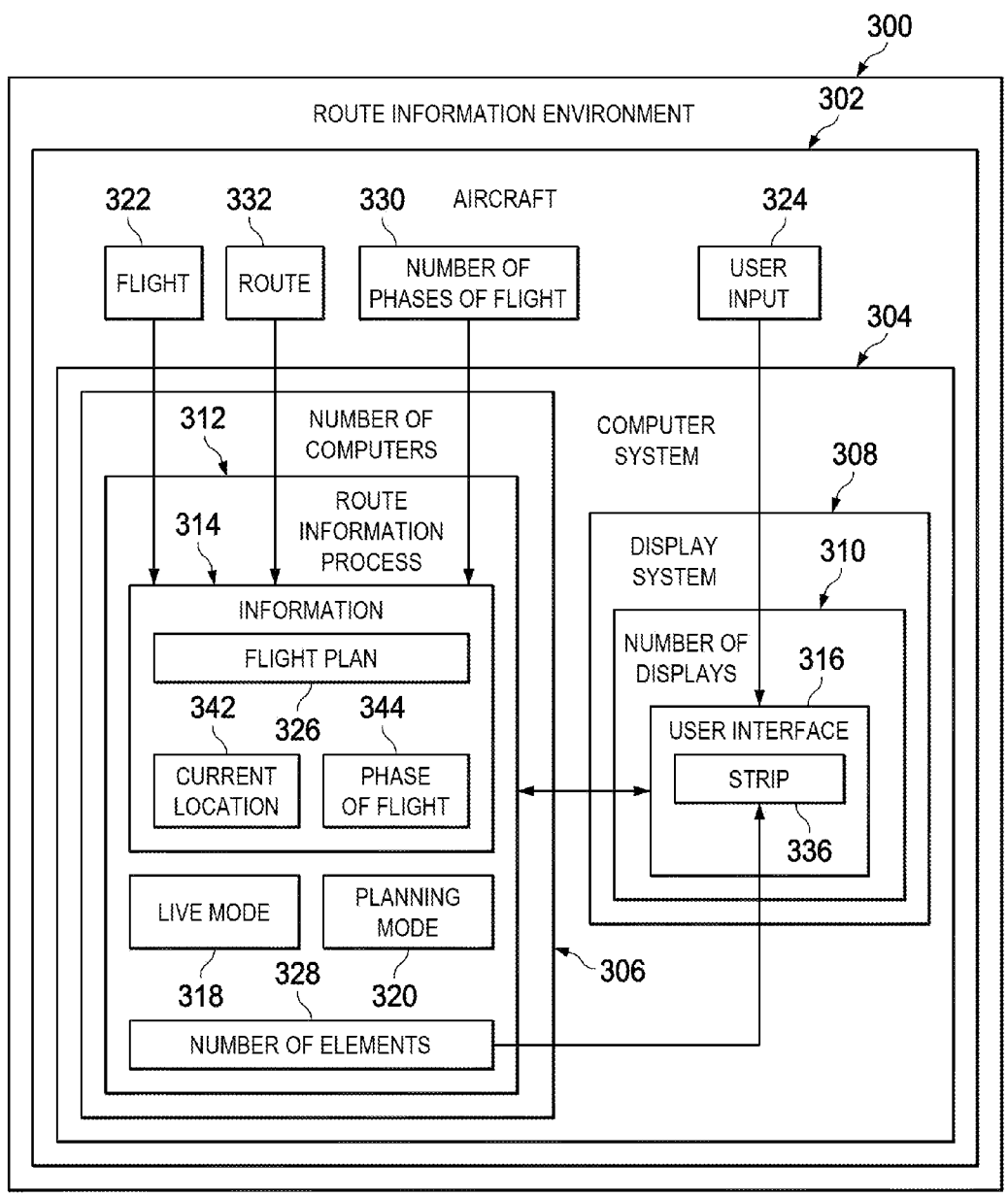
FIG. 3 is an illustration of a route information environment in accordance with an advantageous embodiment.

With reference now to FIG. 3, an illustration of a route information environment is depicted in accordance with an advantageous embodiment. Route information environment 300 in FIG. 3 includes aircraft 302. Aircraft 302 may be implemented in aircraft 100 in FIG. 1. In route information environment 300, computer system 304 is located in aircraft 302.

In this illustrative example, computer system 304 comprises number of computers 306. A number, as used herein with reference to items, means one or more items. For example, a number of computers is one or more computers. Number of computers 306 may be implemented using data processing system 200 in FIG. 2 in these examples. Computer system 304, with number of computers 306 and number of displays 310 in display system 308, may also be referred to as an aircraft information display system in these illustrative examples.

Additionally, computer system 304 includes display system 308. Display system 308 comprises number of displays 310. Number of displays 310 is connected to number of computers 306 in these examples. Number of displays 310 is one or more hardware display devices. For example, a display within number of displays 310 may be a liquid crystal display panel, a heads up display system, or other suitable types of devices.

Route information process 312 runs on one or more of number of computers 306 in computer system 304. Route information process 312 processes information 314.

Information 314 is any information that may be used by the pilot or other flight crew member to operate aircraft 302. Information 314 may include information entered by the flight crew, received from a ground control station, detected by sensors in the aircraft, and/or obtained from other suitable sources. Information 314 includes information, such as, for example, without limitation, a flight plan, a location of the aircraft, a speed of the aircraft, a heading of the aircraft, an altitude of the aircraft, weather information, airport procedures, communication frequencies, charts, and/or other suitable information used to operate an aircraft.

In these illustrative examples, route information process 312 displays information 314 using user interface 316 on display system 308. In the illustrative examples, route information process 312 runs in live mode 318 and planning mode 320. Live mode 318 for route information process 312 occurs while the aircraft is being operated during flight 322 for aircraft 302 to display information 314.

Planning mode 320 for route information process 312 is used to change information 314 for flight 322 in information 314. For example, flight plan 326 is part of information 314. Flight plan 326 includes information, such as waypoints, gates, taxiways, a runway, and/or other suitable information. This information may be entered or changed using route information process 312 in planning mode 320.

During live mode 318, route information process 312 identifies number of elements 328 for number of phases of flight 330 for route 332 of aircraft 302. In these illustrative examples, number of elements 328 is a number of graphical elements. This number of graphical elements may be identified using a plurality of information elements received by route information process 312. Each of the plurality of information elements may correspond to a particular phase of flight in phases of flight 330.

In these illustrative examples, number of elements 328 is displayed for number of phases of flight 330 on strip 336 in user interface 316. Strip 336 also may be referred to as a route strip or an elongate strip in these examples.

In these illustrative examples, route information process 312 uses information 314 to identify number of elements 328 during flight 322 of aircraft 302. For example, route information process 312 identifies current location 342 for aircraft 302 in information 314. Route information process 312 uses current location 342 to identify phase of flight 344 within number of phases of flight 330. Phase of flight 344 is a current phase of flight for aircraft 302. Based on current location 342 and/or phase of flight 344, route information process 312 identifies number of elements 328 for display on strip 336 in user interface 316.

Number of elements 328 displayed on strip 336 changes during flight 322 in response to changes in information 314. In other words, number of elements 328 is updated automatically based on changes to information 314.

Additionally, as phase of flight 344 changes, number of elements 328 also may change, depending on information 314. For example, without limitation, as an element in number of elements 328 displayed on strip 336 is encountered or no longer relevant to flight 322, that element may be removed from strip 336 and/or no longer part of number of elements 328. Further, route information process 312 may also establish a current and/or anticipated phase of flight during flight 322 to update number of elements 328 displayed on strip 336.

In other words, strip 336 changes dynamically and is driven by information 314. For example, number of elements 328 may be identified periodically or in response to events during flight 322. In other illustrative examples, number of elements 328 may be identified once and changed based on changes in information 314.

In addition, route information process 312 also may be used to display information 314 using number of elements 328 on strip 336 during planning mode 320. Planning mode 320 is a period of time or number of operations during which route 332 for aircraft 302 is planned. In planning mode 320, route information process 312 may receive user input 324 to enter data for information 314. User input 324 may be entered using user interface 316.

For example, user input 324 may be entered using strip 336 in user interface 316. In these illustrative examples, user input 324 may take a number of different forms. In the illustrative examples, user input 324 may be text entered using user interface 316, a selection of a number of buttons in user interface 316, or some other suitable type of user input.

As one example, an operator may enter user input 324 in the form of a departure gate or other information in planning route 332 of aircraft 302. Further, user input 324 may be used to view number of elements 328 on strip 336 for different phases within number of phases of flight 330. In other words, an operator may select what information in information 314 and/or which elements in number of elements 328 are presented in strip 336 for a particular phase of flight within number of phases of flight 330.

As a result, an operator may view the different elements for flight 322 of aircraft 302 with route 332 before the flight occurs. Additionally, this information also may be viewed after flight 322 has been completed.

In this manner, route information process 312 changes the operation of computer system 304 in a manner to provide information on display system 308 in a manner that requires less time and effort from an operator of aircraft 302. Strip 336 on display system 308 provide information that is selected and adjusted based on changes in phase of flight 344 during flight of aircraft 302.

The illustration of route information environment 300 in FIG. 3 is not meant to imply physical or architectural limitations to a manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, computer system 304 may be located on the ground. Computer system 304 also may be located at a flight control tower, a ground station, or an airline center. In these locations, route information process 312 may present information about the flight of different aircraft using strip 336. This information may then be sent to the different aircraft using, for example, a wireless communications link.

In still other illustrative examples, route information process 312 may be used in other types of vehicles other than an aircraft. For example, route information process 312 may be located on a computer system within a surface ship or a submarine.

Figure 4:
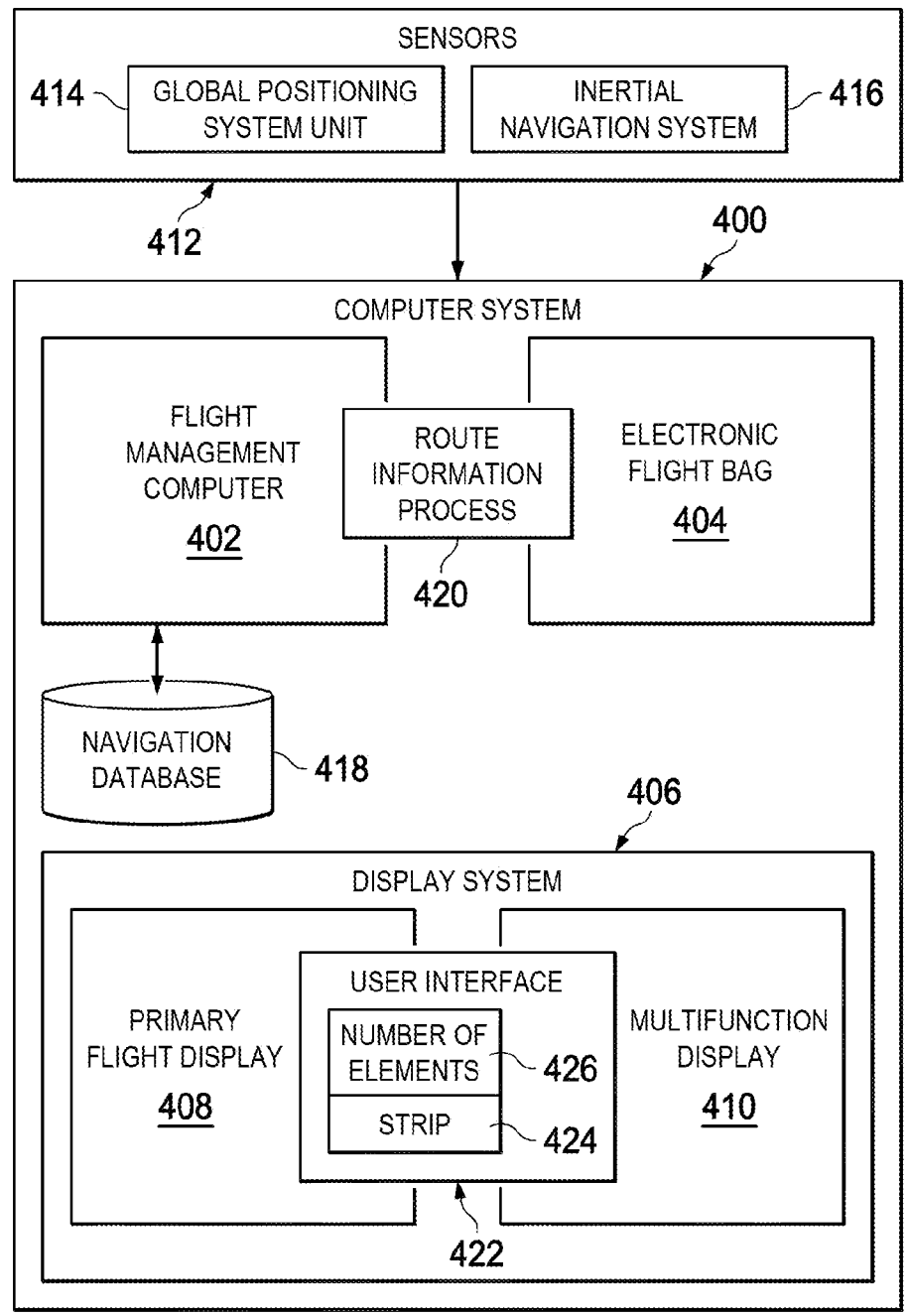
FIG. 4 is an illustration of a computer system in accordance with an advantageous embodiment.

With reference now to FIG. 4, an illustration of a computer system is depicted in accordance with an advantageous embodiment. Computer system 400 is an example of one implementation for computer system 304 in FIG. 3.

As illustrated, computer system 400 comprises flight management computer 402 and electronic flight bag 404. Flight management computer 402 and electronic flight bag 404 may be implemented using data processing system 200 in FIG. 2.

In these illustrative examples, flight management computer 402 is a data processing system that provides in-flight management of a flight plan. Electronic flight bag 404 is a data processing system used to form flight management tasks. Electronic flight bag 404 may store information, such as, for example, an aircraft operating manual, a flight crew operating manual, navigation charts, and/or applications for performing different calculations used to operate an aircraft.

Display system 406 within computer system 400 comprises primary flight display 408 and multifunction display 410. In these illustrative examples, primary flight display 408 and multifunction display 410 are hardware devices that may be used to display information to an operator. Primary flight display 408 displays flight information, such as, for example, airspeed, altitude, heading, attitude, vertical speed, yaw, and/or other suitable information.

Multifunction display 410 displays aeronautical information, weather information, and other suitable types of information. The aeronautical information may include charts overlaid with information including waypoints, route plans, and/or other suitable types of information. Multifunction display 410 also may display information about aircraft systems.

Flight management computer 402 receives input from sensors 412. These sensors include, for example, global positioning system unit 414, inertial navigation system 416, and/or other suitable types of sensors. Sensors 412 generate information.

Further, flight management computer 402 accesses navigation database 418. Navigation database 418 includes elements from which a flight is constructed. Additionally, navigation database 418 also may include data used to generate charts displayed for the flight. These charts may include terrain charts, airport charts, and other suitable types of charts.

In these depicted examples, route information process 420 may run on flight management computer 402 or electronic flight bag 404 to present user interface 422 with number of elements 426 for different phases of flight of the aircraft. In these illustrative examples, user interface 422 with strip 424 may be displayed on multifunction display 410.

With one or more of these features in the different advantageous embodiments, operators, such as pilots, may avoid having to look at multiple displays for flight information. In particular, a pilot may avoid having to look at more than one display to obtain information about waypoints. For example, the waypoints may be displayed on primary flight display 408 with other information using strip 424. In this example, looking to other displays, such as multifunction display 410, may be avoided. In other illustrative examples, strip 424 may be displayed on other displays other than primary flight display 408.

Further, with the different advantageous embodiments, displaying large amounts of information on a display may be avoided. More information needed for operating an aircraft may be presented on strip 424, while less important information is reduced in prominence or not displayed at all. For example, major waypoints may be shown, while minor waypoints are minimized or not shown. Also, information may be displayed on strip 424 based on the current phase of flight of an aircraft.

As a result, strip 424 may make identifying flight information easier on pilots. Pilots may spend less time looking for flight information, such as waypoints. Instead, pilots may focus on other operations that are performed to operate an aircraft. In other words, better situational awareness may result, as well as reduced workload on pilots.

More examples of advantageous embodiments are described below. These descriptions and the figures provide more examples of how different advantageous embodiments can decrease the clutter that is preset in current displays of flight information, how increased ease in obtaining information needed to operate an aircraft and other benefits results from using strip 424, and other features in the different advantageous embodiments.

Figure 5:
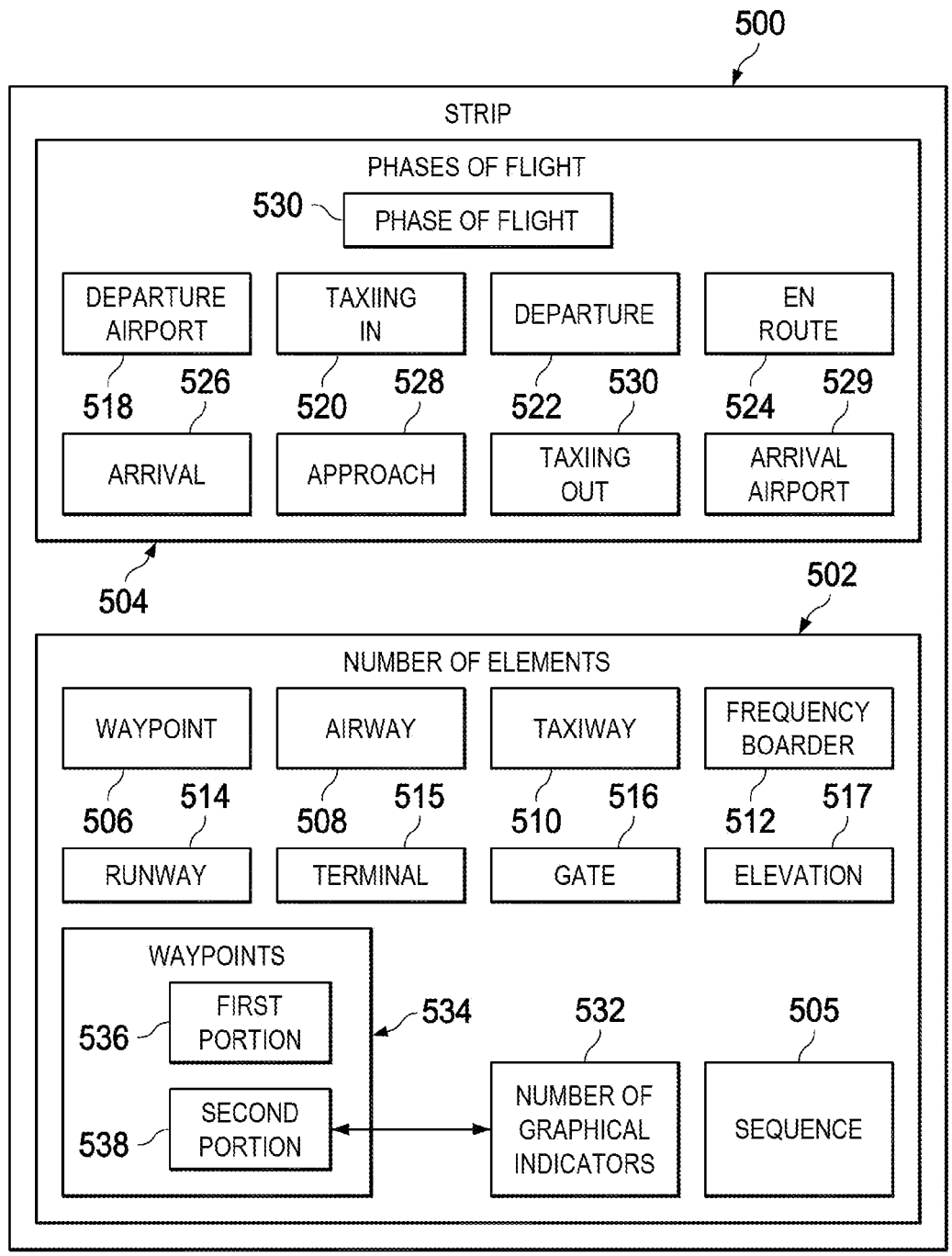
FIG. 5 is an illustration of a strip used to present information about a route in accordance with an advantageous embodiment.

Turning now to FIG. 5, an illustration of a strip used to present information about a route is depicted in accordance with an advantageous embodiment. In this illustrative example, strip 500 is an example of strip 336 in FIG. 3. In these illustrative examples, strip 500 is an elongate area. For example, strip 500 may take the form of a rectangle, an elongate oval, or any other suitable shape.

As depicted, strip 500 includes number of elements 502 for phases of flight 504. Number of elements 502 may be a number of locations along the route for the flight of the aircraft. In these illustrative examples, number of elements 502 includes at least one of waypoint 506, airway 508, taxiway 510, frequency boarder 512, runway 514, terminal 515, gate 516, elevation 517, and/or other suitable types of locations. An element in number of elements 502 may also be a path, an airport, a city, an intersection, a region, or some other suitable type of location.

Phases of flight 504 include at least one of departure airport 518, taxiing in 520, departure 522, en route 524, arrival 526, approach 528, arrival airport 529, taxiing out 530, and/or other suitable phases of flight. In these illustrative examples, departure airport 518 may be for the departure gate at an airport or for the arrival gate at an airport. In some illustrative examples, phases of flight 504 may include departing airport and arriving at airport.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

Number of elements 502 is displayed on strip 500 in sequence 505 in which number of elements 502 is encountered by an aircraft during phases of flight 504. In other words, each element in number of elements 502 is located next to each other on strip 500. These elements are in an order such that each element is part of a sequence in which number of elements 502 is encountered during the operation of the aircraft. For example, if number of elements 502 is a series of waypoints, number of elements 502 is placed in sequence 505 such that each waypoint is in an order in which the waypoint is encountered during the flight of the aircraft.

In these illustrative examples, number of elements 502 may be presented for all of phases of flight 504 or for a particular phase of flight, such as phase of flight 530. Additionally, some elements may be associated with more than one phase of flight.

For example, without limitation, taxiing in 520 and departure 522 are examples of phases of a flight of an aircraft. Taxiing in 520 is a phase in which the aircraft is moving on the ground, and departure 522 is a phase in which the aircraft may be moving on the ground and subsequently in the air. Taxiing in 520 and departure 522 may both include runway 514 in number of elements 502. An aircraft may still be taxiing on a portion of a runway before the aircraft changes to departure 522 to takeoff from the runway. As a result, runway 514 may be associated with both taxiing in 520 and departure 522.

Additionally, number of graphical indicators 532 also may be displayed on strip 500. Number of graphical indicators 532 may be displayed between elements in number of elements 502. Number of graphical indicators 532 indicates that additional elements may be present but not displayed with number of elements 502. In this manner, elements of one priority may be displayed while elements of another priority may be identified using number of graphical indicators 532.

For example, waypoints 534 may include first portion 536 and second portion 538. First portion 536 of waypoints 534 may have a higher priority than second portion 538 of waypoints 534. With this example, number of elements 502 may represent first portion 536 of waypoints 534. Second portion 538 of waypoints 534 may be represented by number of graphical indicators 532. Number of graphical indictors 532 also is displayed in a sequence in which second portion 538 of waypoints 534 are encountered during flight. In other words, graphical indicators 532 are displayed on strip 500 in locations on strip 500 relative to locations where number of elements 502, based on when the waypoints represented by number of elements 502 and graphical indicators 532, are encountered during flight.

In these illustrative examples, number of graphical indicators 532 presents less information than number of elements 502. Additionally, number of graphical indicators 532 may also take up less space as compared to displaying elements for second portion 538 of waypoints 534. Number of graphical indicators 532 for second portion 538 of waypoints 534 may be replaced with elements in response to an event. The event may be, for example, a selection of number of graphical indicators 532, a location of the aircraft within a selected distance of second portion 538 of waypoints 534, a phase of flight, and/or other suitable events.

The number of waypoints may be all of the waypoints or some of the waypoints in second portion 538. Also, a number of waypoints within second portion 538 may be displayed using elements, while other waypoints within second portion 538 may continue to be represented by number of graphical indicators 532. This type of display may occur if the aircraft approaches a waypoint in second portion 538. When the aircraft is within a selected distance of the waypoint, the waypoint may be displayed with an element rather than aggregating it with other waypoints in second portion 538 that are displayed using number of graphical indicators 532.

In this manner, more important information may be presented in number of elements 502 while maintaining an indication of the sequence or order for other information not shown with respect to number of elements 502.

The illustration of strip 500 in FIG. 5 is not meant to imply limitations to a manner in which strip 500 may be presented. For example, in other illustrative examples, strip 500 may include yet other information that may be displayed on strip 500 or in association with strip 500. For example, strip 500 may include an additional region on strip 500 to display additional information about particular elements in number of elements 502. This information may be displayed in response to a selection of an element in number of elements 502.

With reference now to FIGS. 6-17, illustrations of information displayed using a user interface are depicted in accordance with an advantageous embodiment. In these illustrative examples, user interface 600 is an example of one implementation for user interface 316 in FIG. 3.

User interface 600 may be displayed on, for example, display system 308 in FIG. 3, primary flight display 408 in FIG. 4, and/or multifunction display 410 in FIG. 4. The information displayed in user interface 600 may be managed by route information process 312 in FIG. 3. Additionally, the information displayed in user interface 600 may be used by a pilot or other crew member for the flight of an aircraft.

Figure 6:
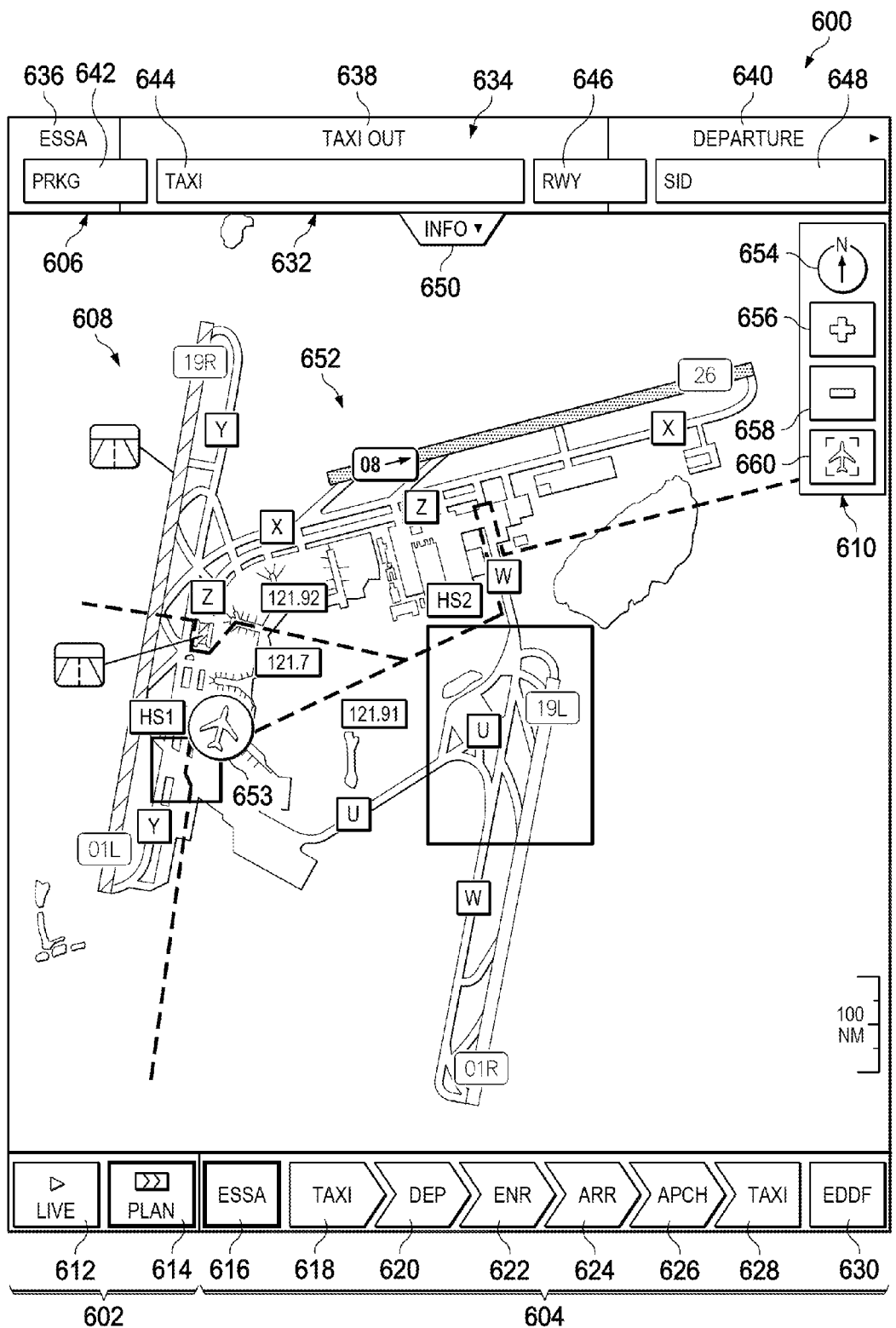
FIG. 6 is an illustration of information displayed using a user interface including a user interface displaying modes menu, a phases of flight menu, a strip, a chart, and a display menu, in accordance with an advantageous embodiment.

Turning now to FIG. 6, an illustration of information displayed using a user interface is depicted in accordance with an advantageous embodiment. As depicted, user interface 600 displays modes menu 602, phases of flight menu 604, strip 606, chart 608, and display menu 610.

In this illustrative example, modes menu 602 includes live mode 612 and planning mode 614. As depicted, planning mode 614 is selected in this example. With the selection of planning mode 614, changes to the flight plan and/or other information for the flight of the aircraft may be made.

Phases of flight menu 604 display phases of flight for the flight of the aircraft. These phases of flight are sequential phases of flight. In other words, the phases of flight occur in an order in which one phase of flight occurs after previous phase for flight. These phases of flight include departure airport 616, taxiing out 618, departure 620, en route 622, arrival 624, approach 626, taxiing in 628, and arrival airport 630. In this illustrative example, departure airport 616 is the Stockholm-Arlanda Airport (ESSA). Arrival airport 630 is the Frankfurt Airport (EDDF). Selecting a phase of flight from phases of flight menu 604 changes the information displayed in strip 606 and/or chart 608 in user interface 600.

Strip 606 takes the form of elongate area 632 in this illustrative example. Elongate area 632 is a rectangle in this example. In this illustrative example, strip 606 has sections that are displayed in an order that is in a direction representing a time axis of the flight of the aircraft. Further, strip 606 is graphically sectioned into sections that are distributed along the time axis of the flight. These sections correspond to a subset of adjacent phases of flight in the phase of flight. In this example, these sections include departure airport section 636, taxiing out section 638, and departure section 640.

Strip 606 is capable of displaying a number of elements for the phases of flight displayed in region 634 in strip 606. For example, region 634 may display a number of elements in strip 606 for departure airport section 636, taxiing out section 638, and departure section 640. Additionally, an element may be present for more than one phase of flight in region 634.

In this illustrative example, the number of elements for the phases of flight displayed in region 634 in strip 606 may be identified in fields in strip 606. In this depicted example, these fields include field 642, field 644, field 646, and field 648. A number of elements for departure airport section 636 may be displayed in field 642. In particular, field 642 may display a gate number to identify the gate at the airport at which the aircraft is currently parked.

A number of elements for taxiing out section 638 may be displayed in field 644. The number of elements may identify, for example, taxiways at the airport that the aircraft should use when leaving the gate at the airport. Field 646 is for displaying a runway from which the aircraft will take off.

A number of elements for the standard instrument departure (SID) route for the aircraft may be displayed in field 648. The standard instrument departure route is the route that the aircraft is to take immediately after takeoff to leave the airport. The standard instrument departure route may include, for example, a number of waypoints.

In this depicted example, the number of elements to be displayed in field 642, field 644, field 646, and field 648 may not actually be displayed until user input has been received selecting, providing text for, or manipulating in some other suitable manner, at least one of these fields.

In this illustrative example, info tab 650 is associated with strip 606. When info tab 650 is selected or manipulated in some other suitable manner, more detailed information for the information presented in strip 606 may be displayed.

As depicted, chart 608 includes airport chart 652 in this illustrative example. Airport chart 652 is displayed in planning mode 614 when departure airport 616 is selected in phases of flight menu 604. Additionally, aircraft icon 653 is displayed on airport chart 652. Aircraft icon 653 is displayed at a location on airport chart 652 that identifies the current location for the aircraft. In this illustrative example, airport icon 653 is located at a gate in the airport.

In this illustrative example, display menu 610 in user interface 600 presents options for manipulating chart 608. For example, display menu 610 includes orientation 654, zoom in button 656, zoom out button 658, and center aircraft button 660. Orientation 654 identifies the orientation of chart 608 with respect to a northern direction.

When zoom in button 656 is selected, a zoomed in and/or more detailed view of chart 608 is displayed. When zoom out button 658 is selected, a zoomed out and/or less detailed view of chart 608 is displayed. Further, aircraft icon button 660 may be selected to center chart 608 with respect to aircraft icon 653.

In these illustrative examples, the information displayed in user interface 600 may use indicators to provide additional information for the pilot and flight crew. For example, the information may use at least one of a selected font, a selected color, a selected highlighting, a selected shading, text, icons, labels, and/or some other suitable selected indicator. As one illustrative example, a runway selected for takeoff may have a selected color. The taxiways at the airport for the taxiing out phase of the aircraft may be highlighted.

Figure 7:
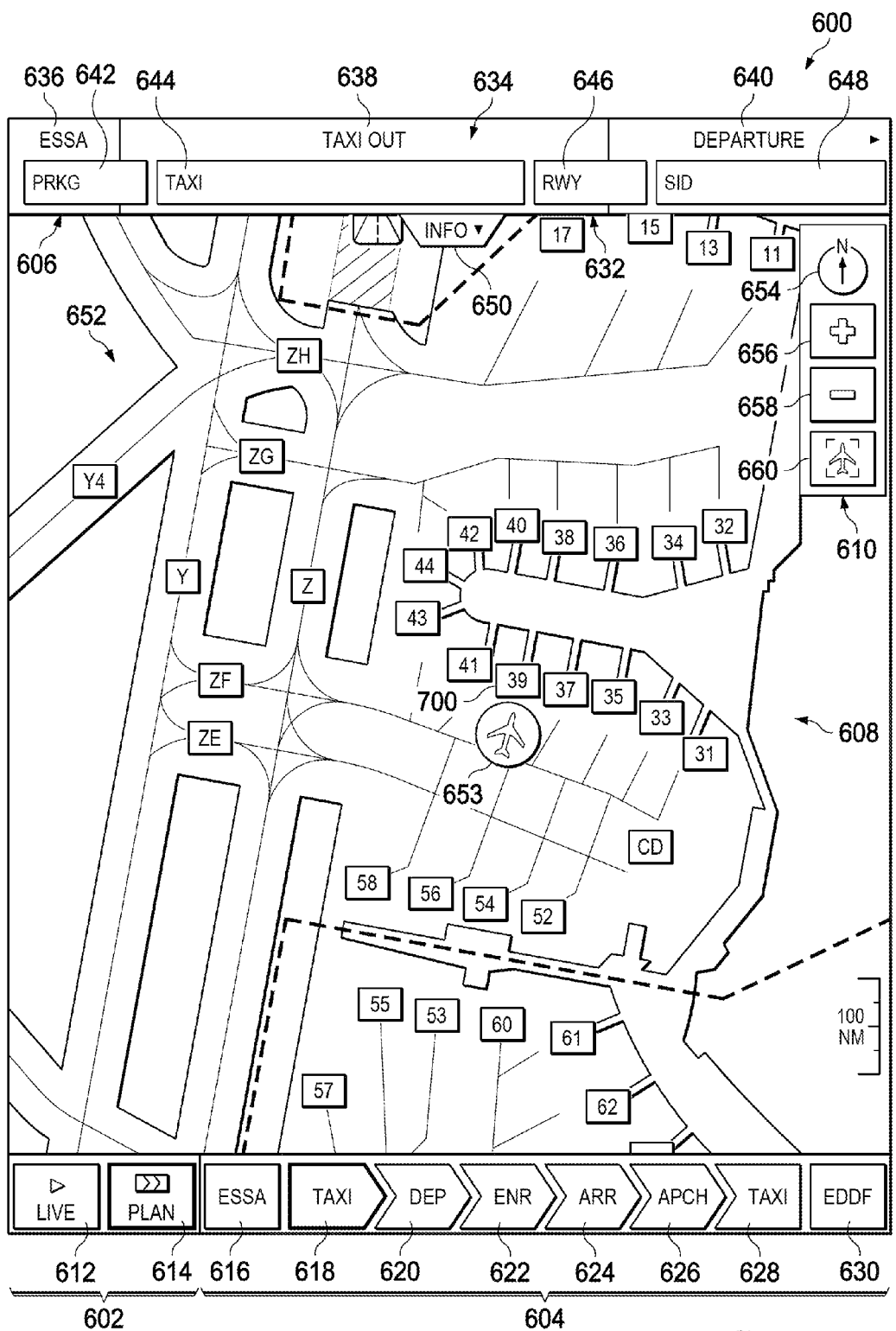
FIG. 7 is an illustration of information displayed using a user interface, including a planning mode selected in a modes menu, in accordance with an advantageous embodiment.

In FIG. 7, an illustration of information displayed using a user interface is depicted in accordance with an advantageous embodiment. In this illustrative example, planning mode 614 is selected in modes menu 602 in user interface 600. Further, taxiing out 618 is selected in phases of flight menu 604.

When taxiing out 618 is selected, chart 608 displays a more detailed view of airport chart 652. As depicted, aircraft icon 653 is located at gate 39 700 in airport chart 652. As one illustrative example, a pilot may select taxiing out 618 to view the different taxiways that may be used when leaving gate 39 700.

Further, the pilot may use the more detailed view of airport chart 652 to select taxiways for taxiing out of the airport.

Figure 8:
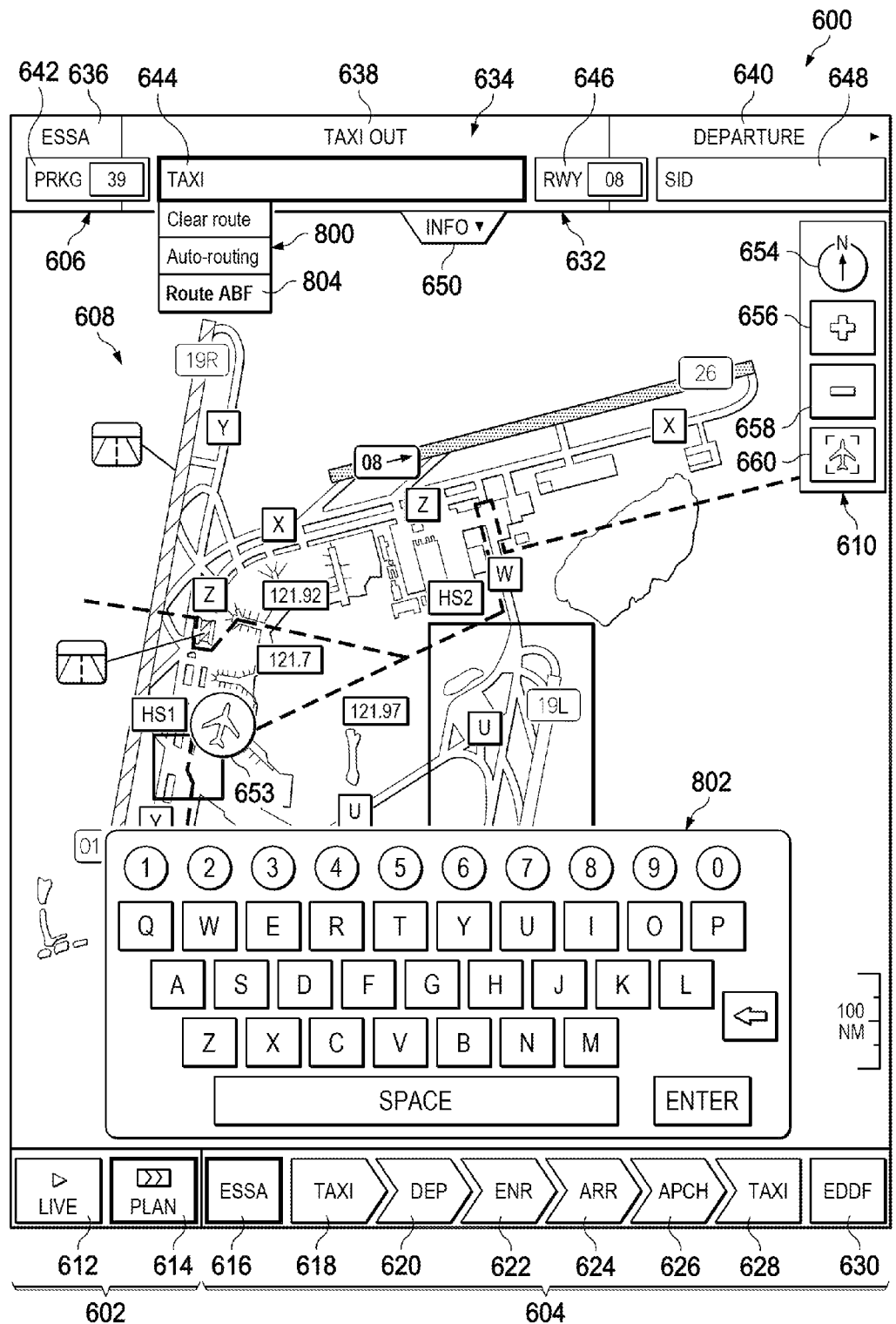
FIG. 8 is an illustration of information displayed using a user interface, including a planning mode selected in a modes menu, with a departure airport selected in a phases of flight menu, in accordance with an advantageous embodiment.

Turning now to FIG. 8, an illustration of information displayed using a user interface is depicted in accordance with an advantageous embodiment. In this illustrative example, planning mode 614 is selected in modes menu 602 in user interface 600. Further, departure airport 616 is selected in phases of flight menu 604.

In this illustrative example, field 642 identifies gate 39 for departure airport section 636. Gate 39 is the gate at which the aircraft is parked at the airport. The identification of gate 39 may be made by a user entering gate 39 in field 642 in one example. The user is the pilot in this example. In another example, the pilot selects field 642. The selection of field 642 causes a menu of different gates to be displayed. The pilot may then select the gate from the menu.

Additionally, field 646 identifies runway 08 as the runway for takeoff. This identification may be made in a manner similar to the identification of gate 39 in field 642. The pilot may then select field 644. The selection of field 644 causes menu 800 and keyboard 802 to be displayed. Selecting an item in menu 800 causes a number of elements for taxiing out section 638 to be identified in field 644. In these illustrative examples, the pilot selects route ABF 804 from menu 800.

In other illustrative examples, the pilot may enter a route for the taxiing out phase. For example, the pilot may enter the identifiers for the taxiways to be taken or the name of a predefined route for the taxiing out phase.

Figure 9:
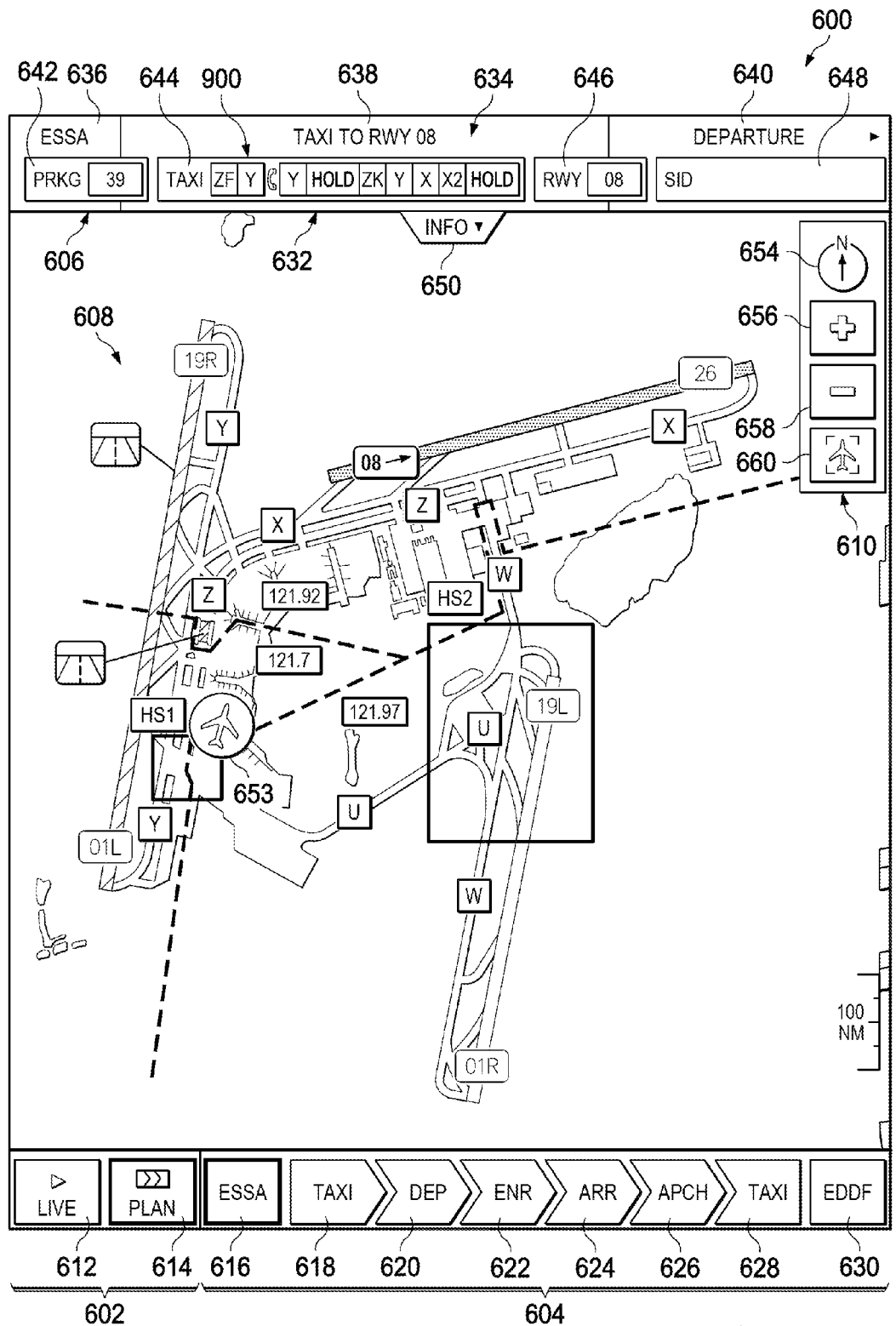
FIG. 9 is an illustration of information displayed using a user interface, including a number of element identified in a field after a pilot selects a route in a menu, in accordance with an advantageous embodiment.

In FIG. 9, an illustration of information displayed using a user interface is depicted in accordance with an advantageous embodiment. Number of elements 900 is identified in field 644 after the pilot selects route ABF 804 in menu 800 in FIG. 8. In this illustrative example, number of elements 900 is graphical elements related to the taxiing out phase of flight. Number of elements 900 is displayed along the time axis according to the period of the flight in taxiing out section 638.

Number of elements 900 includes a number of taxiways that are to be used by the aircraft in the taxiing out phase. When number of elements 900 is displayed in field 644, keyboard 802 and menu 800 in FIG. 8 are removed from user interface 600. In this illustrative example, field 644 also displays other information in addition to number of elements 900.

Figure 10:
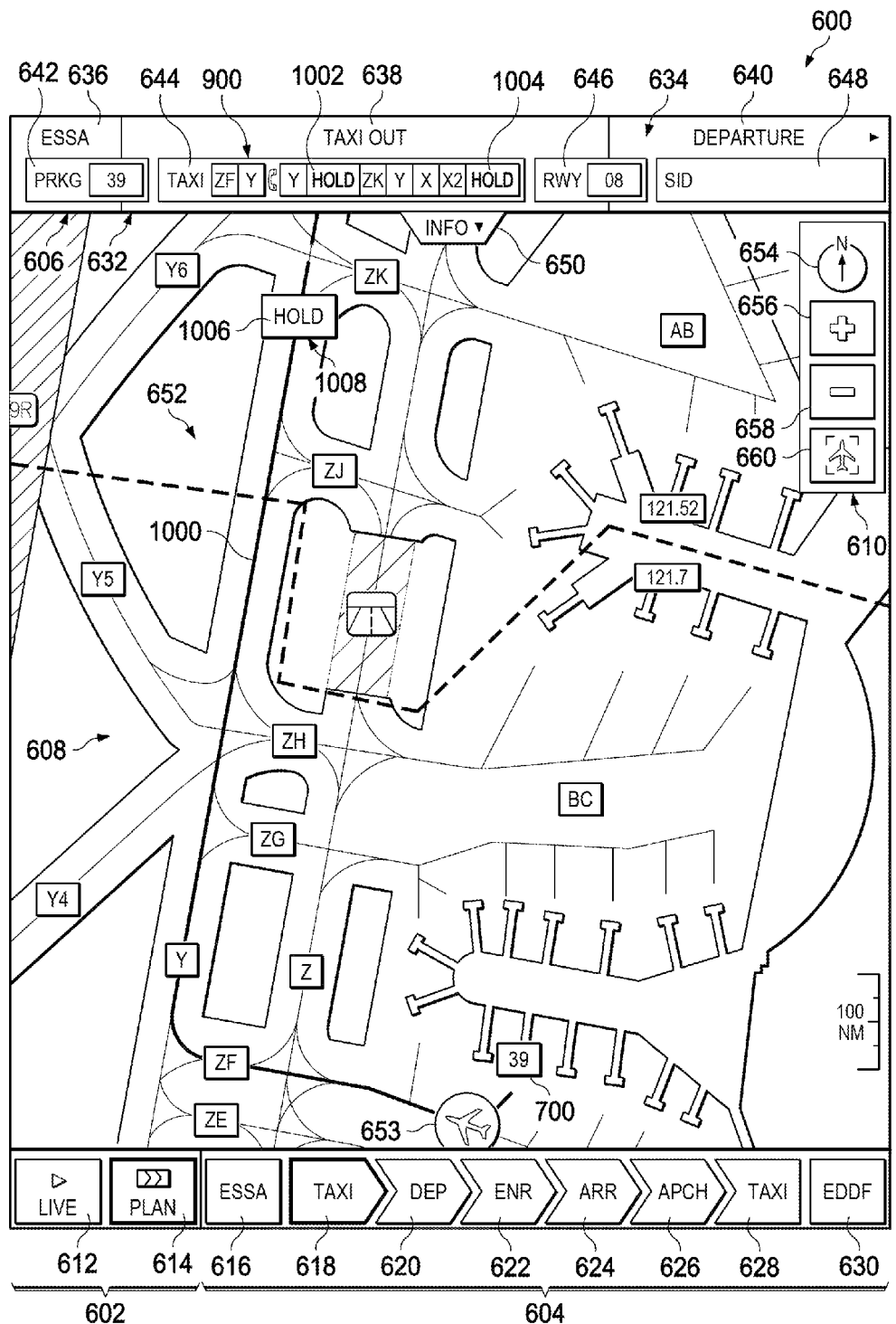
FIG. 10 is an illustration of information displayed using a user interface, including a planning mode selected in a modes menu and a taxing out selection is selected in a phases of flight menu, in accordance with an advantageous embodiment.

Turning now to FIG. 10, an illustration of information displayed using a user interface is depicted in accordance with an advantageous embodiment. In this illustrative example, planning mode 614 is selected in modes menu 602 and taxiing out 618 is selected in phases of flight menu 604.

As depicted, a more detailed view of airport chart 652 is presented for chart 608. In this view, path 1000 is shown for the taxiing out phase for the aircraft. Path 1000 begins at gate 39 700 and continues towards the runway identified in field 646. As depicted, the aircraft encounters the taxiways identified in field 644 while moving along path 1000. Only a portion of path 1000 is shown in this depicted example.

In this illustrative example, graphical indicator 1002 and graphical indicator 1004 indicate instructions to hold the aircraft. For example, graphical indicator 1002 indicates that the aircraft is to hold at position 1006 identified by icon 1008 in airport chart 652 for some selected period of time.

Figure 11:
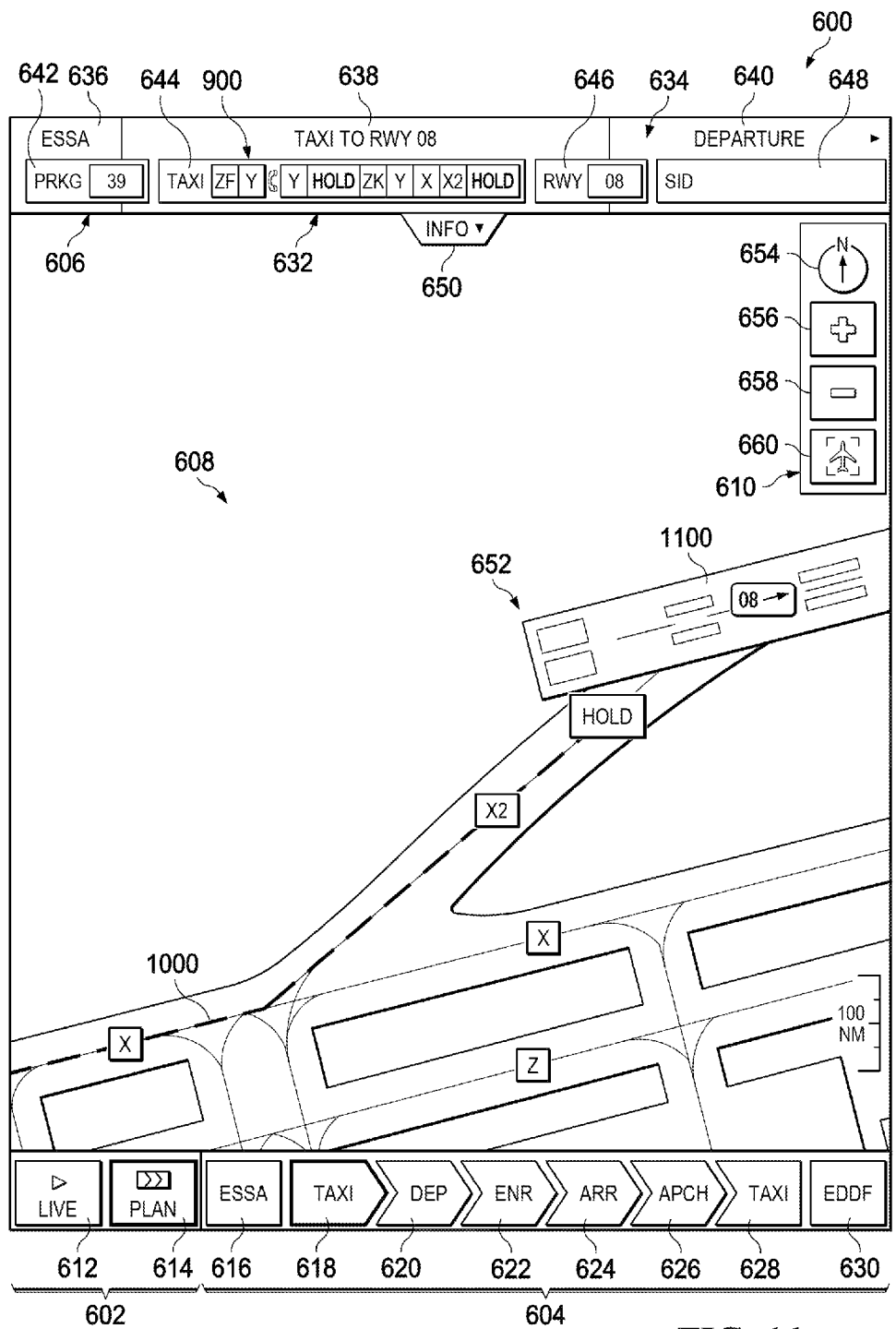
FIG. 11 is an illustration of information displayed using a user interface, including an airport chart that has been manipulated to present a final portion of a path, in accordance with an advantageous embodiment.

In FIG. 11, an illustration of information displayed using a user interface is depicted in accordance with an advantageous embodiment. In this illustrative example, airport chart 652 has been manipulated in user interface 600 to present the final portion of path 1000.

Path 1000 for the aircraft ends at runway 08 1100. In this depicted example, airport chart 652 may be manipulated by the pilot using a device to select the airport chart and drag the airport chart in a direction that allows the final portion of path 1000 to be presented.

Figure 12:
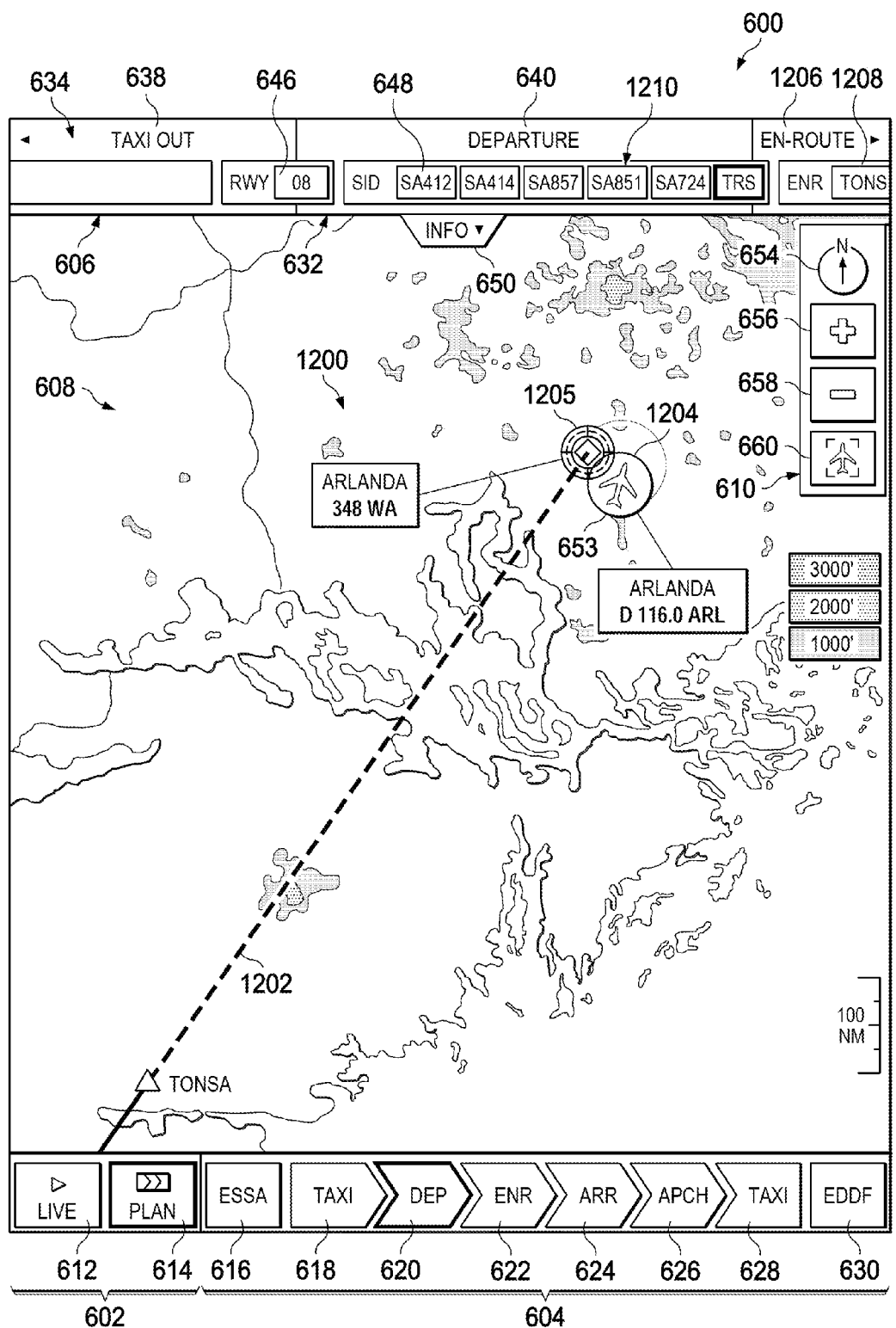
FIG. 12 is an illustration of information displayed using a user interface, including a planning mode selected in a modes menu and a departure selected in a phases of flight menu, in accordance with an advantageous embodiment.

With reference now to FIG. 12, an illustration of information displayed using a user interface is depicted in accordance with an advantageous embodiment. In this illustrative example, planning mode 614 is selected in modes menu 602 in user interface 600. Further, departure 620 is selected in phases of flight menu 604.

As depicted, chart 608 now presents navigation chart 1200. Navigation chart 1200 identifies route 1202 for the flight of the aircraft. Aircraft icon 653 is in location 1204 at the departure airport. The departure airport is indicated by icon 1205 in this example.

In this illustrative example, region 634 displays a different set of phases of flight as compared to region 634 in FIG. 6 and FIG. 7. Departure airport section 636 is no longer displayed in strip 606 because this information is not needed when viewing departure information. As depicted, en route section 1206 is now displayed in region 634. En route section 1206 includes field 1208 for displaying the number of waypoints between the departure and arrival phases of flight for the aircraft. Only a portion of field 1208 is shown in this illustrative example.

Field 648 for departure section 640 identifies number of elements 1210 and/or other suitable information in this illustrative example. Number of elements 1210 includes locations for the route for the departure phase of flight for the aircraft.

When planning mode 614 is selected, the pilot or another flight crew member may make changes to the departure information for the flight.

Figure 13:
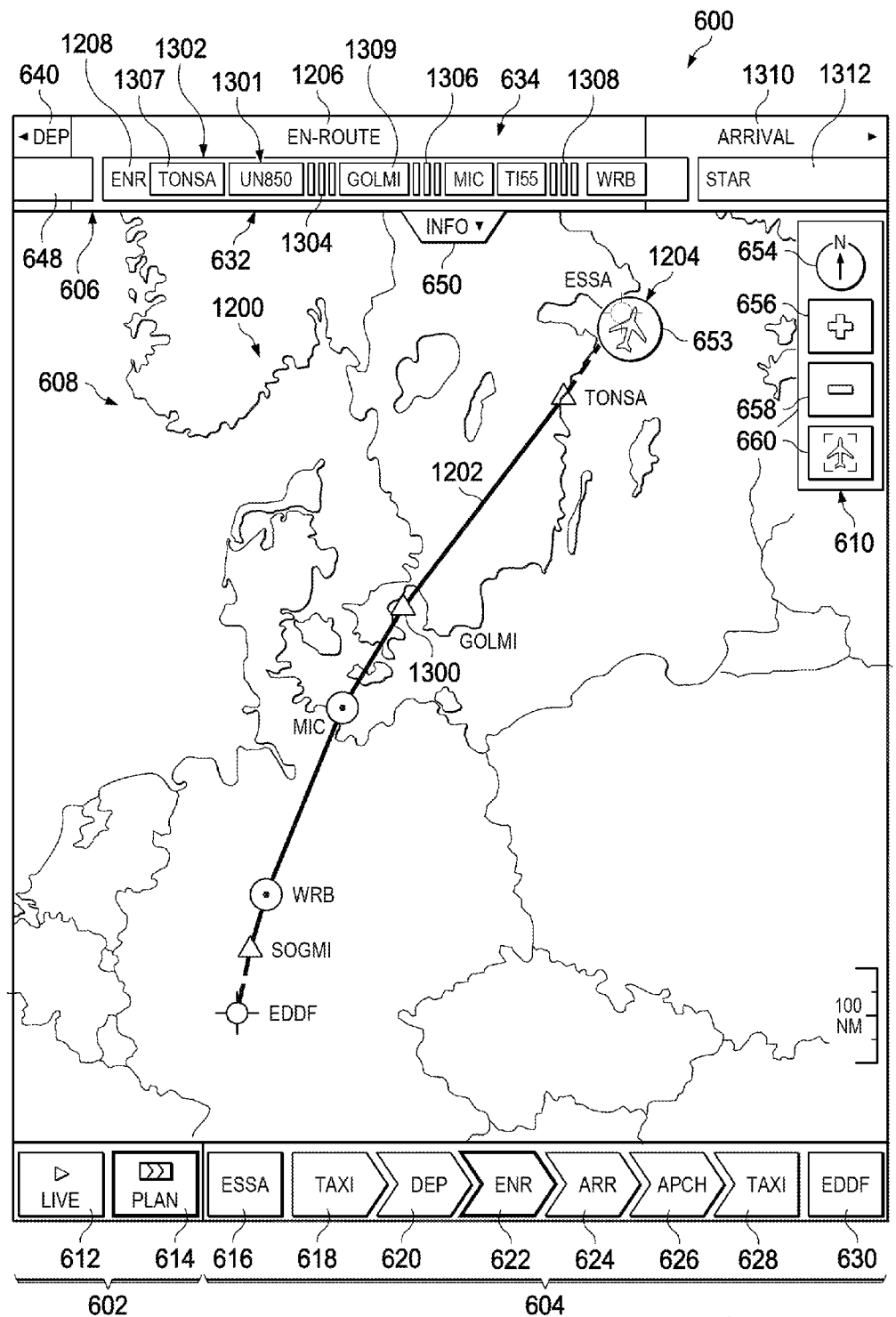
FIG. 13 is an illustration of information displayed using a user interface, including a planning mode selected in a modes menu and an en route selection selected in a phases of flight menu, in accordance with an advantageous embodiment.

In FIG. 13, an illustration of information displayed using a user interface is depicted in accordance with an advantageous embodiment. In this illustrative example, planning mode 614 is selected in modes menu 602 in user interface 600. Further, en route 622 is selected in phases of flight menu 604.

When en route 622 is selected, a zoomed out view of navigation chart 1200 is displayed for chart 608. Number of waypoints 1300 is displayed along route 1202 in this example. This number of waypoints is identified by number of elements 1302 in field 1208 for en route section 1206 in strip 606.

Further, number of elements 1302 is displayed in sequence. In other words, number of waypoints 1302 is displayed in the order in which the waypoints are encountered by the aircraft during flight.

In this illustrative example, graphical indicator 1304, graphical indicator 1306, and graphical indicator 1308 are also displayed in field 1208. Each of these graphical indicators represents a number of waypoints that have a different priority than number of waypoints 1300 displayed in field 1208.

For example, graphical indicator 1304 represents a number of waypoints in sequence between waypoint 1307 and waypoint 1309. This number of waypoints may be in sequence such that the number of waypoints is encountered after waypoint 1307 and before waypoint 1309.

Additionally, in strip 606, taxiing out section 638 and field 646 are removed. Arrival section 1310 is now displayed in strip 606. Further, field 1312 is also displayed in strip 606. Field 1312 is for displaying the Standard Terminal Arrival Route (STAR) for the flight of the aircraft. The Standard Terminal Arrival Route is the route the aircraft between the beginning of the descent for the aircraft and a final approach at the arrival airport.

When planning mode 614 is selected, the pilot or another flight crew member may make changes to the route information for the flight of the aircraft.

Figure 14:
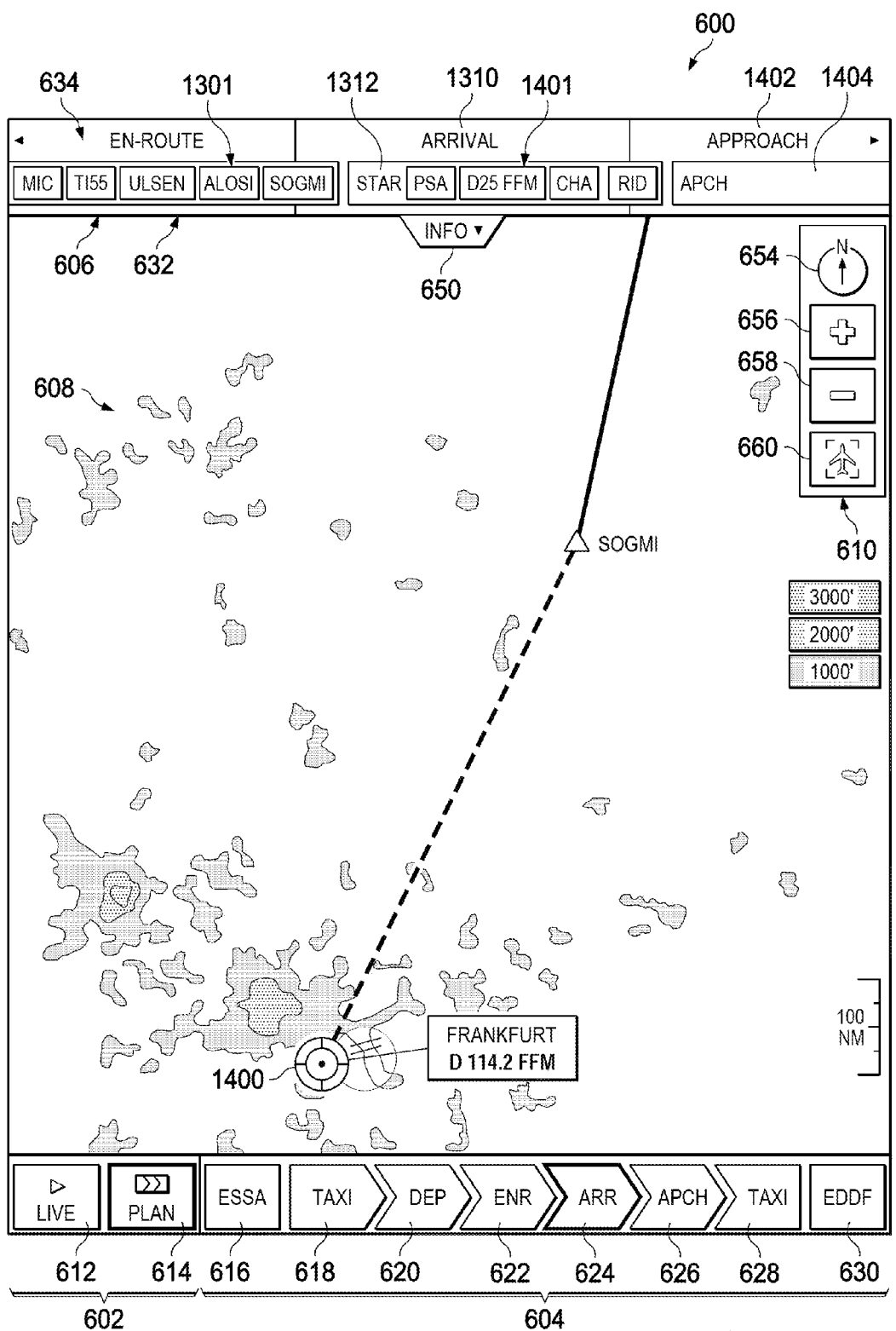
FIG. 14 is an illustration of information displayed using a user interface, including a planning mode selected in a modes menu and an arrival selection selected in a phases of flight menu, in accordance with an advantageous embodiment.

In FIG. 14, an illustration of information displayed using a user interface is depicted in accordance with an advantageous embodiment. In this illustrative example, planning mode 614 is selected in modes menu 602 in user interface 600. Further, arrival 624 is selected in phases of flight menu 604.

When arrival 624 is selected, chart 608 presents a zoomed in view for navigation chart 1200 with respect to the arrival airport. The arrival airport is identified by icon 1400 in this illustrative example. When planning mode 614 is selected, the pilot or another flight crew member may make changes to the route information for the flight of the aircraft.

As depicted, field 1312 for arrival 1308 identifies number of elements 1401 and/or other suitable information. Number of elements 1401 includes locations for the route for the arrival phase of flight for the aircraft.

In this illustrative example, departure section 640 and field 648 are removed from strip 606. Approach section 1402 and field 1404 are added to strip 606. Field 1404 is for displaying a number of elements for approach section 1402 for the flight of the aircraft.

Figure 15:
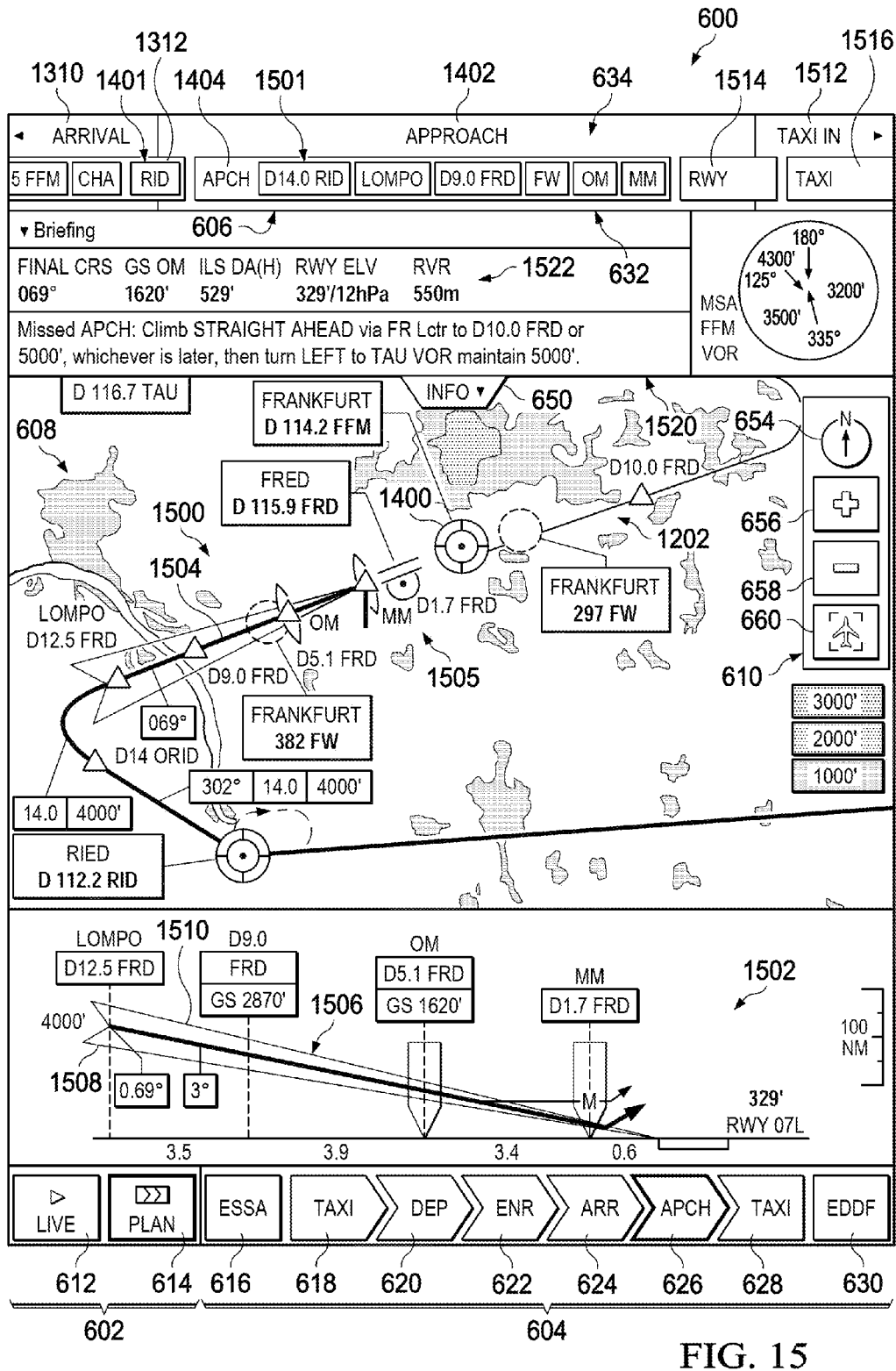
FIG. 15 is an illustration of information displayed using a user interface, including a planning mode selected in a modes menu, and an approach selection selected in a phases of flight menu, in accordance with an advantageous embodiment.

Turning now to FIG. 15, an illustration of information displayed using a user interface is depicted in accordance with an advantageous embodiment. In this illustrative example, planning mode 614 is selected in modes menu 602 in user interface 600. Further, approach 626 is selected in phases of flight menu 604.

As depicted, field 1404 for approach section 1402 identifies number of elements 1501 and/or other suitable information. Number of elements 1501 includes locations for the route for the approach phase of flight for the aircraft.

In this illustrative example, chart 608 includes approach chart 1500 and vertical chart 1502. Approach chart 1500 identifies approach path 1504 for the aircraft when the aircraft arrives at the arrival airport, indicated by icon 1400. Approach path 1504 is a portion of route 1202 for the aircraft. As depicted, number of waypoints 1505 is displayed along approach path 1504 in this example.

Vertical chart 1502 identifies vertical path 1506. Vertical path 1506 is for the descent of the aircraft. Vertical path 1506 indicates the height the aircraft should be at each waypoint along approach path 1504. As depicted, vertical path 1506 identifies a range of heights between line 1508 and line 1510 for the approach of the aircraft.

In this illustrative example, en route section 1206 and field 1208 are removed from strip 606. Taxiing in section 1512, field 1514, and field 1516 are added to strip 606. In this illustrative example, field 1514 is for displaying a runway for the arrival of the aircraft. This runway is for both approach section 1402 and for taxiing in section 1512.

As depicted, info tab 650 is selected in this example. When info tab 650 is selected, window 1520 is displayed underneath strip 606. Information 1522 is presented within window 1520. Information 1522 is information about the approach phase for the flight of the aircraft because approach 626 is selected.

In this manner, the pilot or another flight crew member may select info tab 650 to provide additional information in addition to the information presented in strip 606. Information 1522 may be used to make changes to the flight plan for the aircraft.

Figure 16:
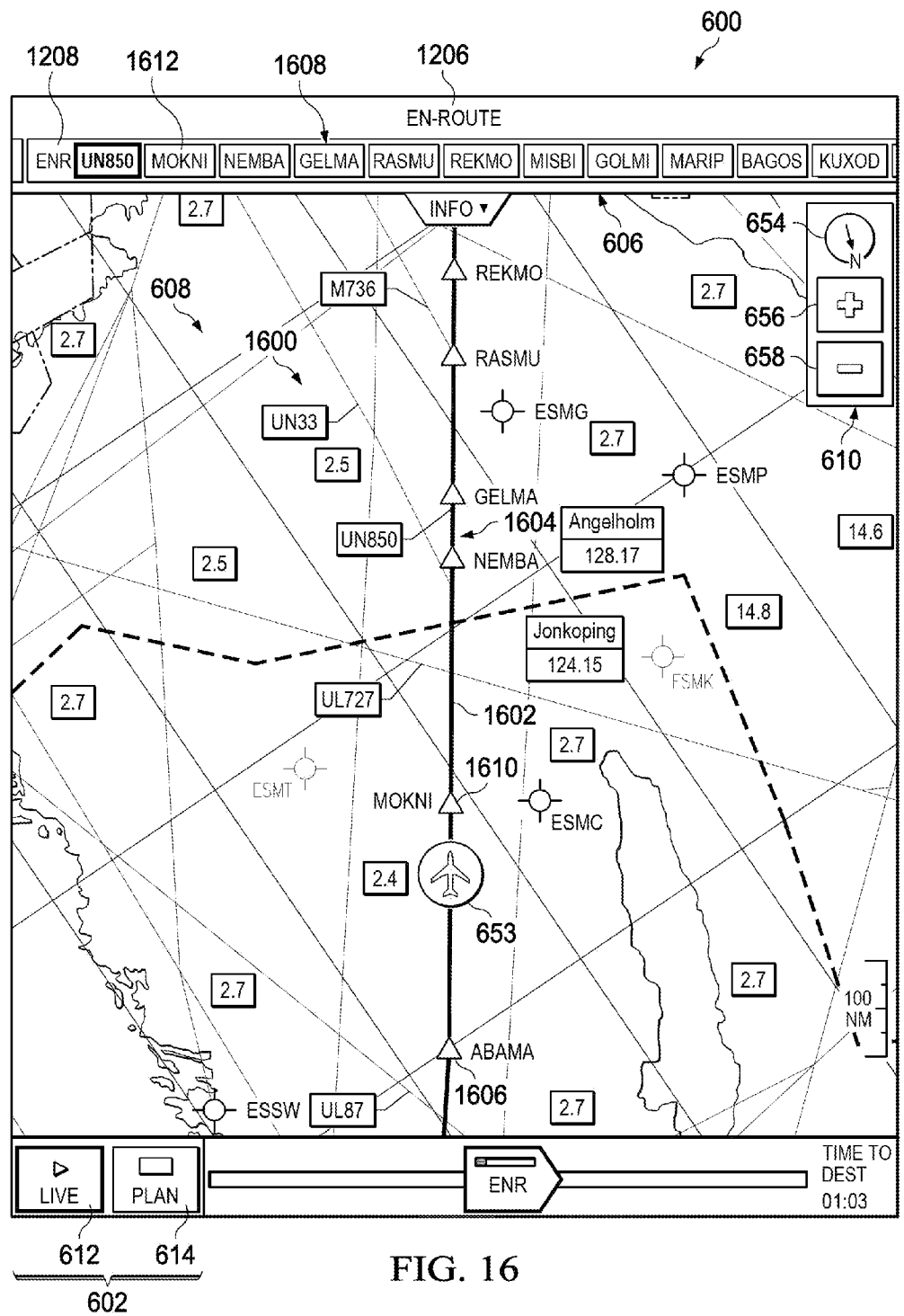
FIG. 16 is an illustration of information displayed using a user interface, including a live mode selected in a modes menu to track a flight of an aircraft in real time, in accordance with an advantageous embodiment.

With reference now to FIG. 16, an illustration of information displayed using a user interface is depicted in accordance with an advantageous embodiment. In this illustrative example, live mode 612 is selected in modes menu 602 in user interface 600. Live mode 612 may be selected during the flight of the aircraft to track the flight of the aircraft in real-time.

When live mode 612 is selected, chart 608 presents dynamic chart 1600. Dynamic chart 1600 displays route 1602 for the flight of the aircraft identified by aircraft icon 653. Number of waypoints 1604 is also displayed along route 1602.

As depicted, field 1208 identifies number of elements 1606. Number of elements 1606 corresponds to number of waypoints 1604 along route 1602. In this illustrative example, only the elements that may be needed by the pilot are displayed in number of elements 1606. For example, an element is not included in number of elements 1606 for waypoint 1608 because the aircraft has already encountered and passed waypoint 1608.

As depicted, the aircraft is approaching waypoint 1610 in this illustrative example. Element 1612 in field 1608 corresponds to waypoint 1610 in this example.

Additionally, when live mode 612 is selected, aircraft icon 660 is removed from display menu 610. Aircraft icon 653 is always displayed in chart 608 when live mode 612 is selected.

Figure 17:
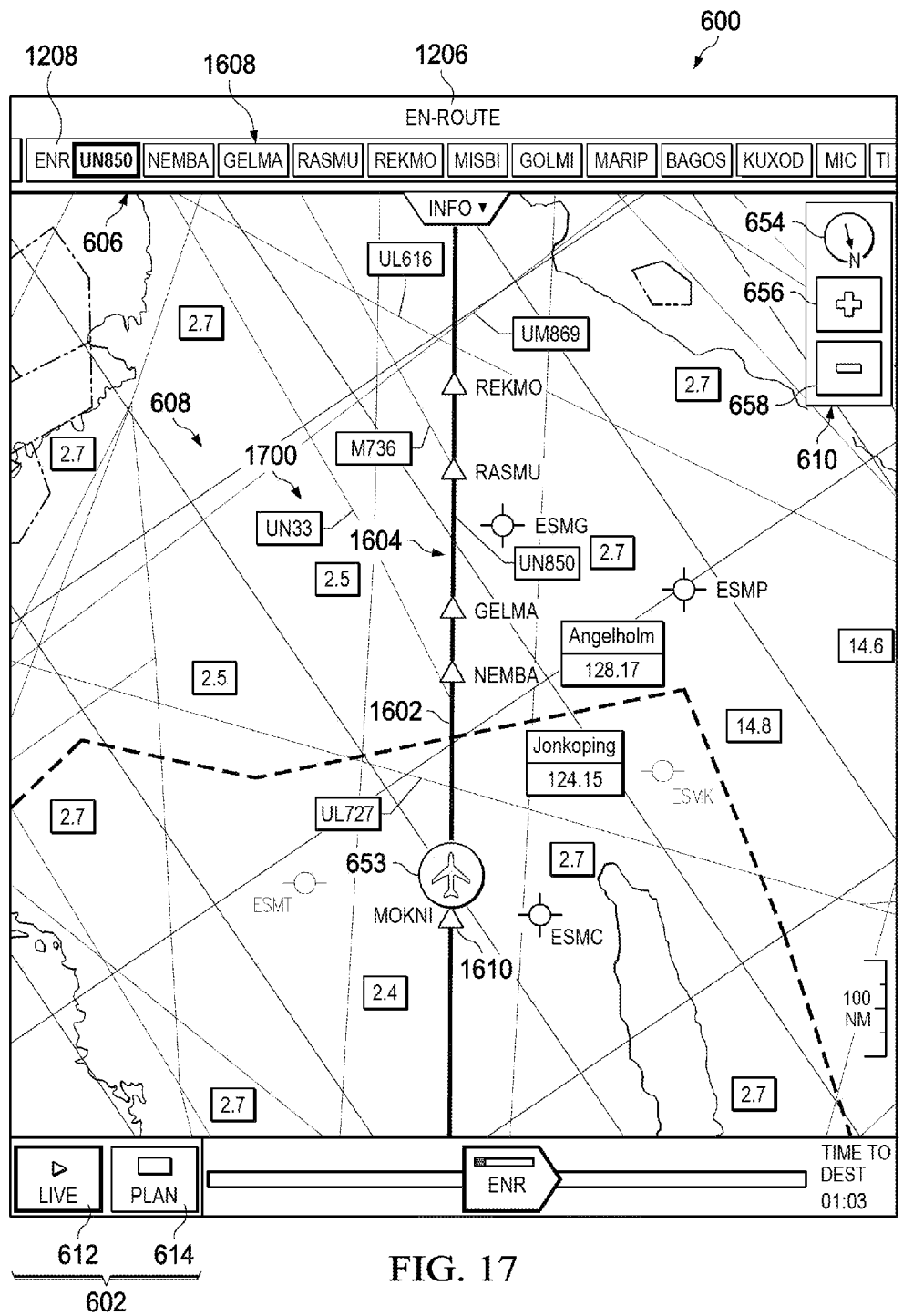
FIG. 17 is an illustration of information displayed using a user interface, including removal an element from a field after passing a waypoint, in accordance with an advantageous embodiment.

Turning now to FIG. 17, an illustration of information displayed using a user interface is depicted in accordance with an advantageous embodiment. In this illustrative example, the aircraft has encountered and passed waypoint 1610. Once the aircraft passes waypoint 1610, element 1612 in field 1608 in FIG. 16 is removed from strip 606.

Figure 18:
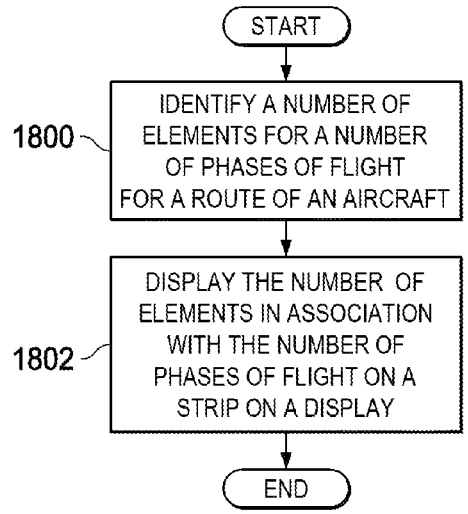
FIG. 18 is an illustration of a flowchart of a process for displaying flight information in accordance with an advantageous embodiment.

With reference now to FIG. 18, an illustration of a flowchart of a process for displaying flight information is depicted in accordance with an advantageous embodiment. The process illustrated in FIG. 18 may be implemented using route information process 312 in FIG. 3.

The process begins by identifying a number of elements for a number of phases of flight for a route of an aircraft (operation 1800). The number of elements may be, for example, number of elements 426 in FIG. 4 and/or number of elements 502 in FIG. 5. The number of elements may be locations along the route for the aircraft. These locations may include, for example, without limitation, at least one of a waypoint, a gate, a terminal, a taxiway, an airway, a runway, an elevation, a frequency boarder, and other suitable types of locations.

Thereafter, the process displays the number of elements in association with the number of phases of flight on a strip on a display (operation 1802), with the process terminating thereafter. The number of elements is displayed on the strip in a sequence in which the number of elements is encountered by the aircraft on the route during the number of phases of flight.

Figure 19:
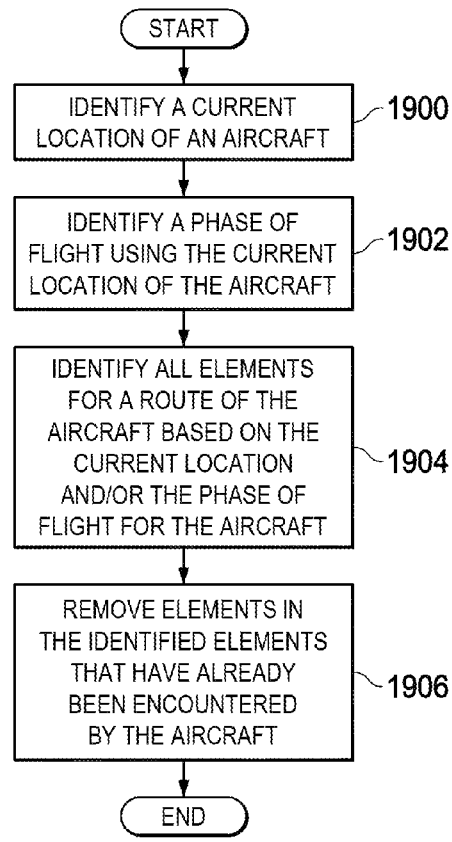
FIG. 19 is an illustration of a flowchart of a process for identifying a number of elements for display in accordance with an advantageous embodiment.

With reference now to FIG. 19, an illustration of a flowchart of a process for identifying a number of elements for display is depicted in accordance with an advantageous embodiment. The process illustrated in FIG. 19 may be implemented using route information process 312 in FIG. 3. In particular, this process is a more detailed process for operation 1800 in FIG. 18.

The process begins by identifying a current location of an aircraft (operation 1900). The current location may be identified using sensors, such as, for example, sensors 412 in FIG. 4. The process then identifies a phase of flight using the current location of the aircraft (operation 1902). The phase of flight may be identified as one of phases of flight 504 in FIG. 5, for example.

Thereafter, the process identifies all elements for a route of the aircraft based on the current location and/or the phase of flight for the aircraft (operation 1904). The elements may include elements in number of elements 502 in FIG. 5, for example.

The process then removes elements in the identified elements that have already been encountered by the aircraft (operation 1906), with the process terminating thereafter. The final identification of elements with the elements already encountered by the aircraft removed from the identification forms the number of elements identified in operation 1800 in FIG. 18.

In some illustrative examples, operation 1906 may be performed a number of times during flight of the aircraft. For example, operation 1906 may be performed each time a selected number of waypoints is encountered.

Figure 20:
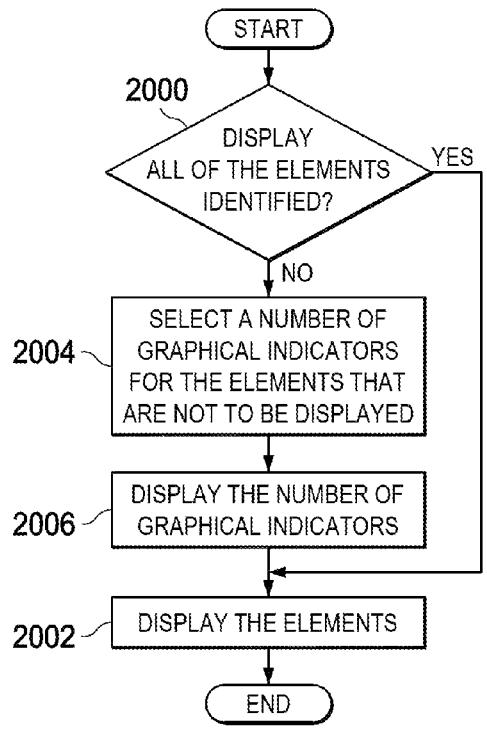
FIG. 20 is an illustration of a flowchart of a process for displaying flight information in accordance with an advantageous embodiment.

With reference now to FIG. 20, an illustration of a flowchart of a process for displaying flight information is depicted in accordance with an advantageous embodiment. The process illustrated in FIG. 20 may be implemented using route information process 312 in FIG. 3. In particular, this process is a more detailed process for operation 1802 in FIG. 18.

The process begins by determining whether to display all of the elements identified (operation 2000). In operation 2000, the elements identified include all of the elements identified in operation 1800 in FIG. 18. This determination may be made based on a set of rules, a policy, priorities for elements, and/or some other suitable factors. For example, elements in the identified elements having a lower priority as compared to other elements in the identified elements may not need to be displayed.

If all of the elements identified are to be displayed, the process displays the elements (operation 2002), with the process terminating thereafter. However, if not all of the elements are to be displayed, the process selects a number of graphical indicators for the elements that are not to be displayed (operation 2004).

Thereafter, the process displays the number of graphical indicators (operation 2006). Next, the process proceeds to operation 2002 as described above.

Figure 21:
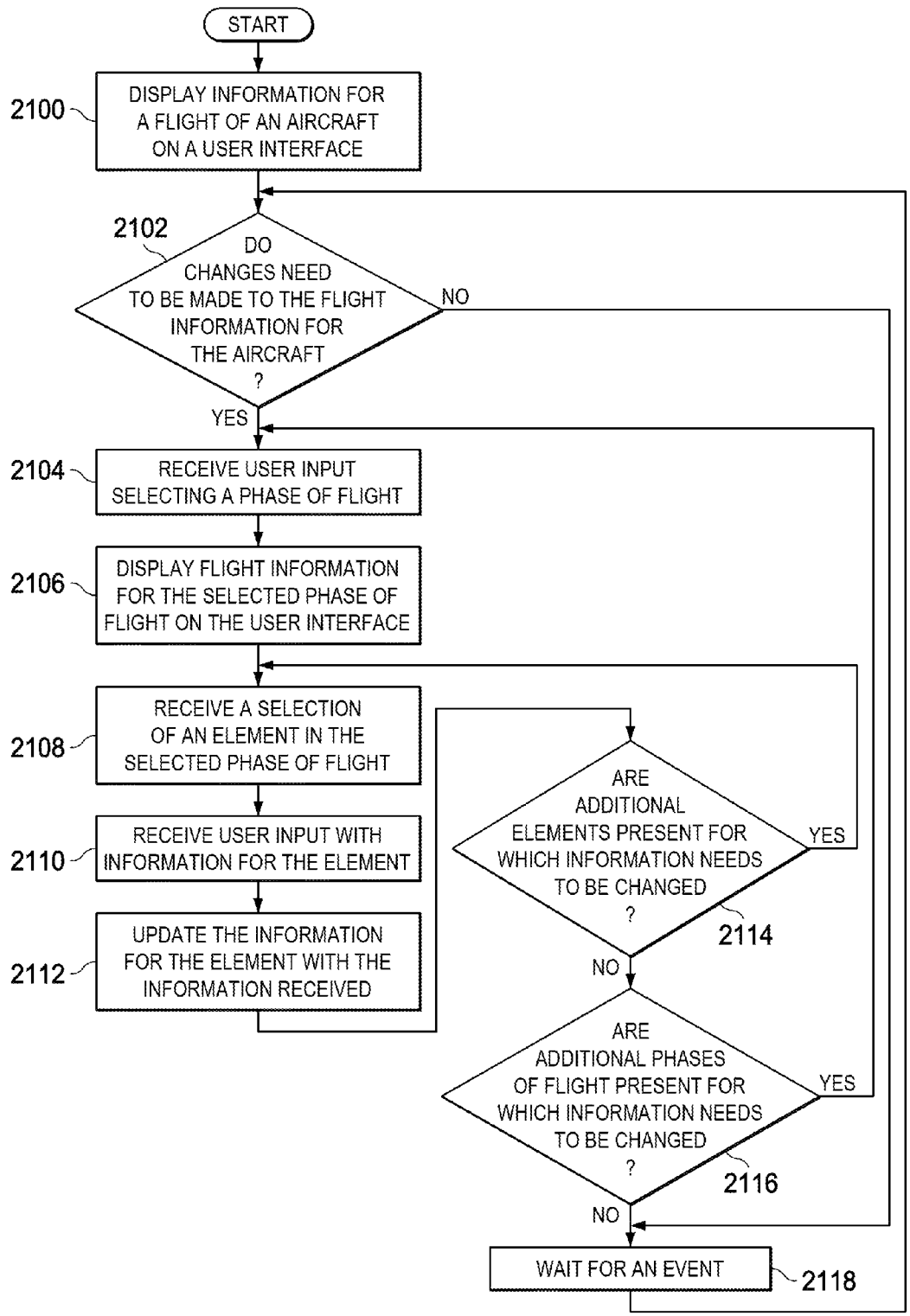
FIG. 21 is an illustration of a process for managing route information in accordance with an advantageous embodiment.

With reference now to FIG. 21, an illustration of a process for managing route information is depicted in accordance with an advantageous embodiment. The process illustrated in FIG. 21 may be implemented using route information process 312 in FIG. 3.

The process begins by displaying information for a flight of an aircraft on a user interface (operation 2100). The process then determines whether changes need to be made to the flight information for the aircraft (operation 2102). In these illustrative examples, this determination may be made in response to and/or based on an event. The event may be, for example, a period of time, user input received using the user interface, a notification from a ground control station, a message from an airline center, or some other suitable event.

If changes need to be made to the flight information, the process receives user input selecting a phase of flight (operation 2104). The phase of flight selected is the phase of flight for which the flight information needs to be changed.

The process then displays flight information for the selected phase of flight on the user interface (operation 2106). Next, the process receives a selection of an element in the selected phase of flight (operation 2108). Thereafter, the process receives user input providing information for the element (operation 2110).

The process then updates the information for the element with the information received (operation 2112). Thereafter, the process determines whether additional elements are present for which information needs to be changed (operation 2114).

If no additional elements are present, the process determines whether additional phases of flight are present for which information needs to be changed (operation 2116). If no additional phases of flight are present, the process then waits for an event (operation 2118), with the process then returning to operation 2102 as described above.

With reference again to operation 2114, if additional elements are present for which information needs to be changed, the process then returns to operation 2108 as described above. With reference again to operation 2116, if additional phases of flight are present for which information needs to be changed, the process then returns to operation 2104 as described above.

With reference again to operation 2102, if changes do not need to be made to the flight information for the aircraft, the process proceeds to operation 2118 as described above.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, in some illustrative examples, operation 2004 and operation 2006 in FIG. 20 may be performed at the same time. In other illustrative examples, operations 1904 and 1906 in FIG. 19 may be repeated a number of times during the flight of the aircraft.

Thus, the advantageous embodiments provide a method and apparatus for displaying flight information. A number of elements for a number of phases of flight for a route of an aircraft are identified. The number of elements is displayed in association with the number of phases of flight on a strip on a display. The number of elements is displayed on the strip in a sequence in which the number of elements is encountered by the aircraft on the route during the number of phases of flight.

As a result, the different advantageous embodiments provide information that is used to operate an aircraft. The display of the information is performed in a manner that reduces to time and effort needed by a pilot or other operator of an aircraft to find the information needed to operate the aircraft.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying flight information, the method comprising:

identifying, by a computer system, a plurality of elements for a corresponding plurality of phases of flight for a route of an aircraft, the plurality of phases of flight comprising at least two of a parking phase, a taxiing phase, a departing phase, an en route phase, an arriving phase, and an approach phase; and displaying, by the computer system, the plurality of elements in association with the corresponding plurality of phases of flight on a strip on a display system, wherein the plurality of elements is displayed on the strip in a sequence in which the plurality of elements is encountered by the aircraft on the route during the corresponding plurality of phases of flight, wherein the strip comprises an elongate strip graphically sectioned into a plurality of sections distributed along a time axis corresponding to a subset of adjacent ones of sequential phases of flight, and wherein as an element in the plurality of elements displayed on the strip is encountered or no longer relevant to a flight of the aircraft, the element is removed from the strip or is no longer part of the plurality of elements;

wherein the plurality of elements is a plurality of waypoints in which a first portion of the plurality of waypoints has a higher priority than a second portion of the plurality of waypoints, the corresponding plurality of phases of flight is an en route phase, and the step of identifying the plurality of elements for the corresponding plurality of phases of flight for the route of the aircraft comprises:

identifying the plurality of elements as the first portion of the plurality of waypoints; and displaying a plurality of graphical indicators for the second portion of the plurality of waypoints, wherein the plurality of graphical indicators provide less information about the second portion of the plurality of waypoints as compared to elements displayed on the strip for the first portion of the plurality of waypoints.

2. The method of claim 1 further comprising:

displaying a chart with the plurality of elements on the strip on the display system.

3. The method of claim 1 further comprising:

identifying a current location of the aircraft relative to the route during flight;

wherein the step of identifying the plurality of elements for the corresponding plurality of phases of flight for the route of the aircraft comprises:

identifying the plurality of elements for the corresponding plurality of phases of flight for the route of the aircraft based on the current location of the aircraft.

4. The method of claim 1 further comprising:
identifying a current phase of flight for the aircraft relative to the route during flight;
wherein the step of identifying the plurality of elements for the corresponding plurality of phases of flight for the route of the aircraft comprises:
identifying the plurality of elements for the corresponding plurality of phases of flight for the route of the aircraft based on the current phase of flight for the aircraft.

5. The method of claim 1, wherein the step of identifying the plurality of elements for the corresponding plurality of phases of flight for the route of the aircraft comprises:
identifying the plurality of elements for the corresponding plurality of phases of flight for the route of the aircraft based on the plurality of waypoints displayed for the route on a chart displayed on the display system.

6. The method of claim 5 further comprising:
identifying information for the plurality of elements; and
displaying the information for the plurality of elements in association with the plurality of elements.

7. The method of claim 6, wherein the step of displaying the information for the plurality of elements in association with the plurality of elements comprises:
responsive to a user input for a second element in the plurality of elements, displaying the information for the second element.

8. The method of claim 6 further comprising:
responsive to a user input selecting a second element corresponding to a waypoint in the plurality of waypoints displayed on the display system, displaying information about the waypoint.

9. The method of claim 1 further comprising:
repeating identifying the plurality of elements for the corresponding plurality of phases of flight for the route of the aircraft and displaying the plurality of elements in association with the corresponding plurality of phases of flight on the strip on the display system as the aircraft travels on the route.

10. The method of claim 1, wherein the step of identifying the plurality of elements for the corresponding plurality of phases of flight for the route of the aircraft comprises:
identifying the plurality of waypoints for the route of the aircraft; and removing any element in the plurality of elements corresponding to a waypoint in the plurality of waypoints that has been encountered by the aircraft.

11. The method of claim 1, wherein the step of the identifying the plurality of elements for the corresponding plurality of phases of flight for the route of the aircraft further comprises:
displaying the plurality of waypoints in the second portion with the plurality of elements instead of using the plurality of graphical indicators for the second portion of a plurality of waypoints in response to an event.

12. The method of claim 1 further comprising:
operating the aircraft using the strip displayed on the display system.

13. An aircraft information display system comprising:
a number of display devices; and
a processor unit connected to the number of display devices, wherein the processor unit is configured to:
identify a plurality of elements for a corresponding plurality of phases of flight for a route of an aircraft during operation of the aircraft, wherein the plurality of phases of flight comprises at least two of a parking phase, a taxiing phase, a departing phase, an en route phase, an arriving phase, and an approach phase, and wherein the plurality of elements represents a first portion of a plurality of waypoints in which the first portion of the plurality of waypoints has a higher priority than a second portion of the plurality of waypoints;
display the plurality of elements in association with the corresponding plurality of phases of flight on a strip on the plurality of display devices as the aircraft travels on the route, wherein the strip comprises an elongate strip graphically sectioned into a plurality of sections distributed along a time axis corresponding to a subset of adjacent ones of sequential phases of flight, and wherein the plurality of elements is displayed on the strip in a sequence in which the first portion of the plurality of waypoints represented by the plurality of elements is encountered by the aircraft during the corresponding plurality of phases of flight;
display a plurality of graphical indicators for the second portion of the plurality of waypoints on the strip in locations relative to the plurality of elements displayed on the strip based on locations of the second portion of the plurality of waypoints relative to locations of the first portion of the plurality of waypoints, wherein the plurality of graphical indicators provides less information about the second portion of the plurality of waypoints as compared to the plurality of elements displayed on the strip for the first portion of the plurality of waypoints; and
remove, as an element in the plurality of elements displayed on the strip is encountered or no longer relevant to a flight of the aircraft, the element from the strip or to remove the element from the plurality of elements.

14. The aircraft information display system of claim 13, wherein the processor unit is further configured to display a chart with the plurality of elements on the strip on the number of display devices.

15. The aircraft information display system of claim 13, wherein the processor unit is further configured to:
identify at least one of a current location of the aircraft and a current phase of flight for the aircraft relative to the route during flight; and
identify the plurality of elements for the corresponding plurality of phases of flight for the route of the aircraft based on the at least one of the current location of the aircraft and the current phase of flight for the aircraft.

16. The aircraft information display system of claim 13, wherein in being configured to identify the plurality of elements for the corresponding plurality of phases of flight for the route of the aircraft during the operation of the aircraft, the processor unit is configured to identify the plurality of elements for the corresponding plurality of phases of flight for the route of the aircraft based on waypoints displayed for the route on a chart displayed on the number of display devices.

17. The aircraft information display system of claim 13, wherein the processor unit is further configured to:
identify information for the plurality of elements; and
display the information for the plurality of elements in association with the plurality of elements.

18. The aircraft information display system of claim 13, wherein the processor unit is further configured to repeat identifying the plurality of elements for the corresponding plurality of phases of flight for the route of the aircraft during the operation of the aircraft and displaying the plurality of elements in association with the corresponding plurality of phases of flight on the strip on the number of display devices as the aircraft travels on the route.

19. A method of displaying flight information on a display system in an aircraft, the method comprising:

displaying, by a computer system in the aircraft, an elongate strip in a graphical user interface on the display system for the aircraft, wherein the elongate strip is divided into a plurality of sections distributed along a time axis corresponding to a subset of adjacent ones of sequential phases of flight, and wherein the plurality of sections are in an order of when each phase of flight occurs relative to another phase of flight in the phases of flight represented by the plurality of sections, the phases of flight comprising at least two of a parking phase, a taxiing phase, a departing phase, an en route phase, an arriving phase, and an approach phase; displaying, by the computer system, elements on the plurality of sections based on the at least a portion of the phases of flight represented by the plurality of sections, wherein the elements are displayed in a sequence in which the elements are encountered by the aircraft during the phases of flight; and responsive to a current phase of flight for the aircraft changing, updating, by the computer system, the plurality of sections and the elements displayed on the plurality of sections to include the plurality of sections and the elements for a plurality of phases of flight including the current phase of flight for the aircraft, and wherein as an element in the elements displayed on the strip is encountered or no longer relevant to a flight of the aircraft, the element is removed from the strip or is no longer part of the elements;

wherein the elements are waypoints in which a first portion of the waypoints has a higher priority than a second portion of the waypoints and the phases of flight include an en route phase and wherein the step of displaying, by the computer system, the elements on the plurality of sections based on the at least a portion of the phases of flight represented by the plurality of sections, wherein the elements are displayed in the order in which the elements are encountered by the aircraft during the phases of flight comprises:

displaying the elements on the elongate strip on the display system, wherein the elements are displayed on the plurality of sections in the elongate strip in the order in which the elements are encountered by the aircraft during the phases of flight and the elements are for the first portion of the waypoints; and displaying a plurality of graphical indicators for the second portion of the waypoints, wherein the plurality of graphical indicators provide less information about the second portion of the waypoints as compared to the elements displayed on the strip for the first portion of the waypoints.

\* \* \* \* \*